United States Patent
Ota

(10) Patent No.: US 10,649,313 B2
(45) Date of Patent: May 12, 2020

(54) ELECTRONIC APPARATUS AND METHOD FOR CONTROLLING SAME

(71) Applicant: CANON KABUSHIKI KAISHA, Tokyo (JP)

(72) Inventor: Tomohiro Ota, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 56 days.

(21) Appl. No.: 16/131,135

(22) Filed: Sep. 14, 2018

(65) Prior Publication Data
US 2019/0011805 A1    Jan. 10, 2019

Related U.S. Application Data

(63) Continuation of application No. PCT/JP2017/011080, filed on Mar. 21, 2017.

(30) Foreign Application Priority Data

Mar. 22, 2016   (JP) .................................. 2016-057556
Feb. 10, 2017   (JP) .................................. 2017-023475

(51) Int. Cl.
*H04N 5/232*     (2006.01)
*H04N 3/04*      (2006.01)
(Continued)

(52) U.S. Cl.
CPC ............. *G03B 13/36* (2013.01); *G03B 7/091* (2013.01); *G06F 3/0412* (2013.01);
(Continued)

(58) Field of Classification Search
CPC ........... H04N 5/23245; H04N 5/23293; H04N 5/23216; H04N 5/23219; H04N 5/23296;
(Continued)

(56) References Cited

U.S. PATENT DOCUMENTS 9,420,192 B2 * 8/2016 Iwasaki .............. H04N 5/23251
                                                         348/223.1
10,523,879 B2 * 12/2019 Dye ....................... H04N 5/262
                                                         348/239
(Continued)

FOREIGN PATENT DOCUMENTS

JP    2007-019685 A    1/2007
JP    2011-164949 A    8/2011
(Continued)

OTHER PUBLICATIONS

The foreign references 1-3, 5 and 6 were cited in the International Search Report dated May 23, 2017 of International Application No. PCT/JP2017/011080.

*Primary Examiner* — Marly S Camargo

(74) *Attorney, Agent, or Firm* — Cowan, Liebowitz & Latman, P.C.

(57) ABSTRACT

Disclosed are an electronic apparatus that achieves both the convenience of touch operation and accurate position specification, and a method for controlling the same. When an area that meets a predetermined condition has been detected in an image, the electronic apparatus executes a function corresponding to a position where a touch has been detected by touch detection means. When the area that meets the predetermined condition has not been detected or area detection is not carried out, the electronic apparatus carries out a process corresponding to an operation for moving a touched position rather than carrying out processing corresponding to the position where the touch has been detected by the touch detection means.

14 Claims, 15 Drawing Sheets

(51) Int. Cl.
    *G02F 1/133*     (2006.01)
    *G03B 13/36*     (2006.01)
    *G03B 7/091*     (2006.01)
    *G02B 7/10*     (2006.01)
    *G06F 3/041*     (2006.01)
    *H04N 5/225*     (2006.01)

(52) U.S. Cl.
    CPC ....... G06F 3/0416 (2013.01); H04N 5/22525 (2018.08); H04N 5/23212 (2013.01); H04N 5/23216 (2013.01); H04N 5/23219 (2013.01); H04N 5/23245 (2013.01); H04N 5/23293 (2013.01); H04N 5/23296 (2013.01); H04N 5/232127 (2018.08); H04N 5/232945 (2018.08)

(58) Field of Classification Search
    CPC ............ H04N 5/232127; G06F 3/0412; G06F 3/0416–0418; G06F 3/0488–04886; G02F 1/13338; G03B 13/36; G03B 7/091; G02B 7/09; G02B 7/102

USPC .. 348/333.01, 169, 208.14, 14.03, 345, 346; 345/167, 173; 382/103, 118
See application file for complete search history.

(56) References Cited

U.S. PATENT DOCUMENTS

| | | | | |
|---|---|---|---|---|
| 2009/0262211 | A1* | 10/2009 | Mori | H04N 5/228 348/222.1 |
| 2011/0019058 | A1* | 1/2011 | Sakai | G06F 3/041 348/333.01 |
| 2018/0220062 | A1* | 8/2018 | Funatsu | H04N 5/232 348/333.1 |
| 2019/0191101 | A1* | 6/2019 | Ogawa | H04N 5/232127 348/352 |

FOREIGN PATENT DOCUMENTS

| | | |
|---|---|---|
| JP | 2012-098594 A | 5/2012 |
| JP | 2012-203143 A | 10/2012 |
| JP | 2013-150265 A | 8/2013 |
| JP | 2013-162425 A | 8/2013 |

* cited by examiner

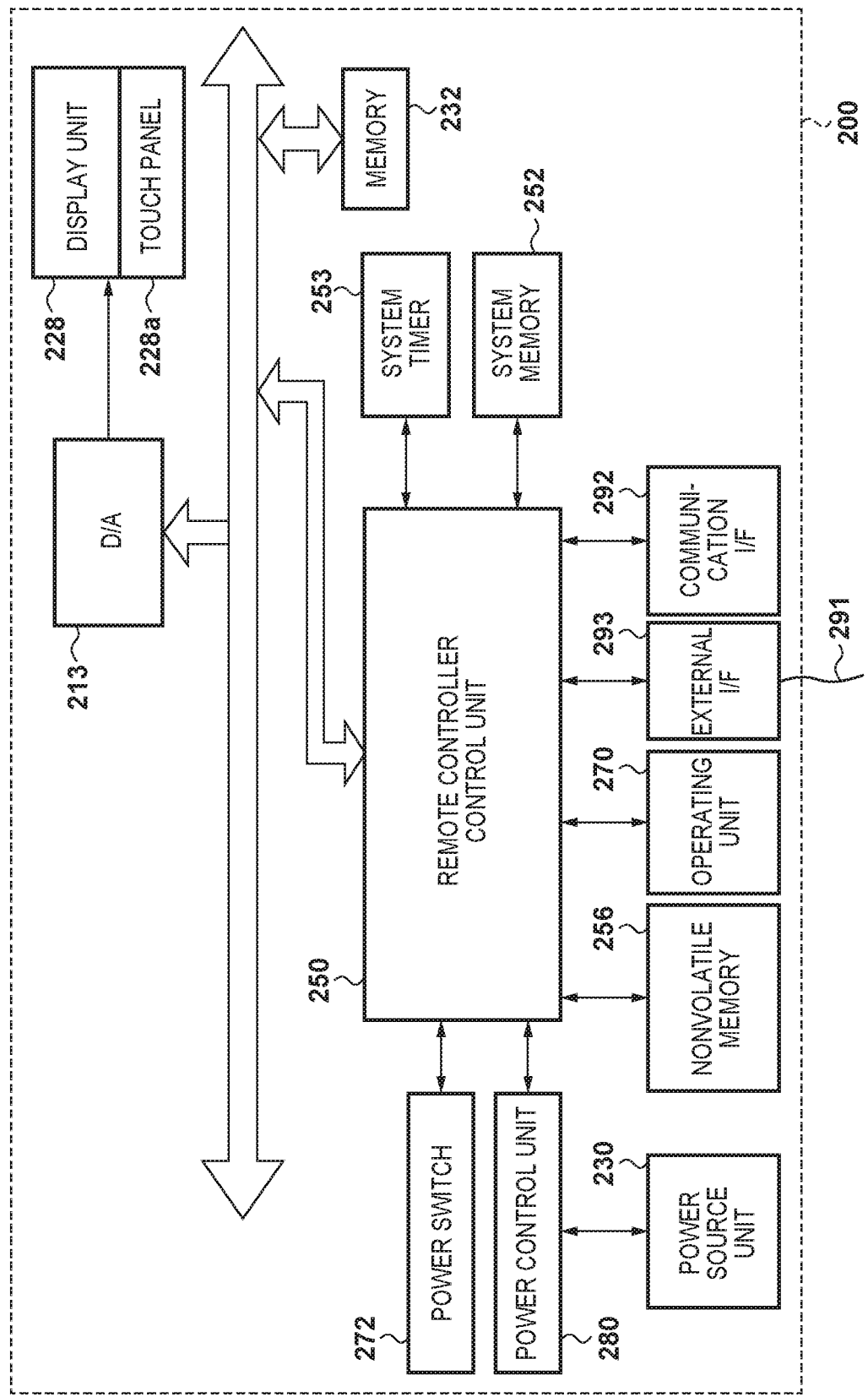

ELECTRONIC APPARATUS AND METHOD FOR CONTROLLING SAME

CROSS-REFERENCE TO RELATED APPLICATIONS

This application is a Continuation of International Patent Application No. PCT/JP2017/011080, filed on Mar. 21, 2017, which claims the benefit of Japanese Patent Application No. 2016-057556, filed on Mar. 22, 2016 and Japanese Patent Application No. 2017-023475, filed on Feb. 10, 2017, all of which are hereby incorporated by reference herein in their entirety.

BACKGROUND OF THE INVENTION

Field of the Invention

The present invention relates to an electronic apparatus and a method for controlling the same.

Background Art

A digital camera that comprises a touch display for displaying a live view image and that allows a user to specify a focus detection area (an AF frame) and an area to be appropriately exposed through automatic exposure (AE) control (an AE area) to touched positions on the touch display, is known (Patent Document 1).

Many modern digital cameras have from 16 to more than 20 million pixels, but touch displays have resolutions of approximately 400,000 to 1.2 million pixels and with sizes of no more than about 3 inches. While some smartphones and tablet devices feature touch displays that are larger and have higher resolutions, such displays have 4 million pixels and with sizes of no more than 10 inches.

Captured images displayed in the touch display are therefore reduced considerably, and thus it is not easy to specify an intended position accurately through a touch operation of the touch display. In particular, when specifying an AF frame or an AE area for shooting, it is necessary to must use a finger on one hand while holding the electronic apparatus in the other hand, or extend a finger on the hand holding the device, to touch the screen. This makes it even more difficult to specify the intended position accurately.

Having been conceived in light of such problems with the conventional techniques, it is an object of the present invention to provide an electronic apparatus, and a method of controlling the same, that strike a balance between the convenience of touch operations and precisely specifying a position.

CITATION LIST

Patent Literature

Patent Document 1: Japanese Patent Laid-Open No. 2012-203143

SUMMARY OF THE INVENTION

According to an aspect of the present invention, there is provided an electronic apparatus comprising: a touch detector configured to detect an operation on a touch sensing surface; a memory and at least one processor and/or at least one circuit to perform the operations of the following units: a setting unit configured to set a first operation mode in the case where an area that meets a predetermined condition is detected in an image and set a second operation mode in the case where the area is not detected or detection of the area is not carried out; and a control unit configured to control so that in the case where the first operation mode is set, a function corresponding to a position where the touch detector have detected a touch is executed, and in the case where the second operation mode is set, a process based on a movement operation of a touched position is executed instead of processing corresponding to the position where the touch detector have detected the touch.

According to another aspect of the present invention, there is provided an electronic apparatus comprising: a detector that detect an area that meets a predetermined condition in an image; and a memory and at least one processor and/or at least one circuit to perform the operations of: a control unit configured to control operations of a touch-sensitive device in accordance with whether or not the area has been detected by the detector, wherein in the case where the area has been detected by the detector, the control unit activates an absolute position operation for the touch-sensitive device, and in the case where the area has not been detected by the detector, the control unit inactivates the absolute position operation for the touch-sensitive device and activate a relative position operation.

According to a further aspect of the present invention, there is provided a method of controlling an electronic apparatus, comprising: setting a first operation mode in the case where an area that meets a predetermined condition is detected in an image and setting a second operation mode in the case where the area is not detected or detection of the area is not carried out; detecting an operation on a touch sensing surface; and carrying out control so that in the case where the first operation mode is set, a function corresponding to a position where the detecting has detected a touch is executed, and in the case where the second operation mode is set, a process based on a movement operation of a touched position is executed instead of a process corresponding to the position where the detecting has detected the touch.

According to another aspect of the present invention, there is provided a method of controlling an electronic apparatus, comprising: detecting an area that meets a predetermined condition in an image; and in the case where the area has been detected in the detecting, activating an absolute position operation for a touch-sensitive device, and in the case where the area has not been detected in the detecting, inactivating the absolute position operation for the touch-sensitive device and activating a relative position operation.

According to a further aspect of the present invention, there is provided a non-transitory computer-readable storage medium in which is stored a program that causes a computer of an electronic apparatus that comprises a touch detector configured to detect an operation on a touch sensing surface to function as: a setting unit configured to set a first operation mode in the case where an area that meets a predetermined condition is detected in an image and set a second operation mode in the case where the area is not detected or detection of the area is not carried out; and a control unit configured to control so that in the case where the first operation mode is set, a function corresponding to a position where the touch detector have detected a touch is executed, and in the case where the second operation mode is set, a process based on a movement operation of a touched position is executed instead of processing corresponding to the position where the touch detector have detected the touch.

According to another aspect of the present invention, there is provided a non-transitory computer-readable storage medium in which is stored a program that causes a computer of an electronic apparatus that comprises a detector that detect an area that meets a predetermined condition in an image to function as: a control unit configured to control operations of a touch-sensitive device in accordance with whether or not the area has been detected by the detector, wherein in the case where the area has been detected by the detector, the control unit activates an absolute position operation for the touch-sensitive device, and in the case where the area has not been detected by the detector, the control unit inactivates the absolute position operation for the touch-sensitive device and activate a relative position operation.

Further features of the present invention will become apparent from the following description of exemplary embodiments with reference to the attached drawings.

BRIEF DESCRIPTION OF THE DRAWINGS

FIG. 3B is a block diagram illustrating an example of the functional configuration of the remote controller according to embodiments.

FIG. 4AB is a flowchart pertaining to operations of the digital camera according to embodiments.

FIG. 4BB is a flowchart pertaining to operations of the digital camera according to embodiments.

FIG. 4CB is a flowchart pertaining to operations of the digital camera according to embodiments.

DESCRIPTION OF THE EMBODIMENTS

Exemplary embodiments of the present invention will be described hereinafter with reference to the drawings.

(Digital Camera 100)

Figure 1A:
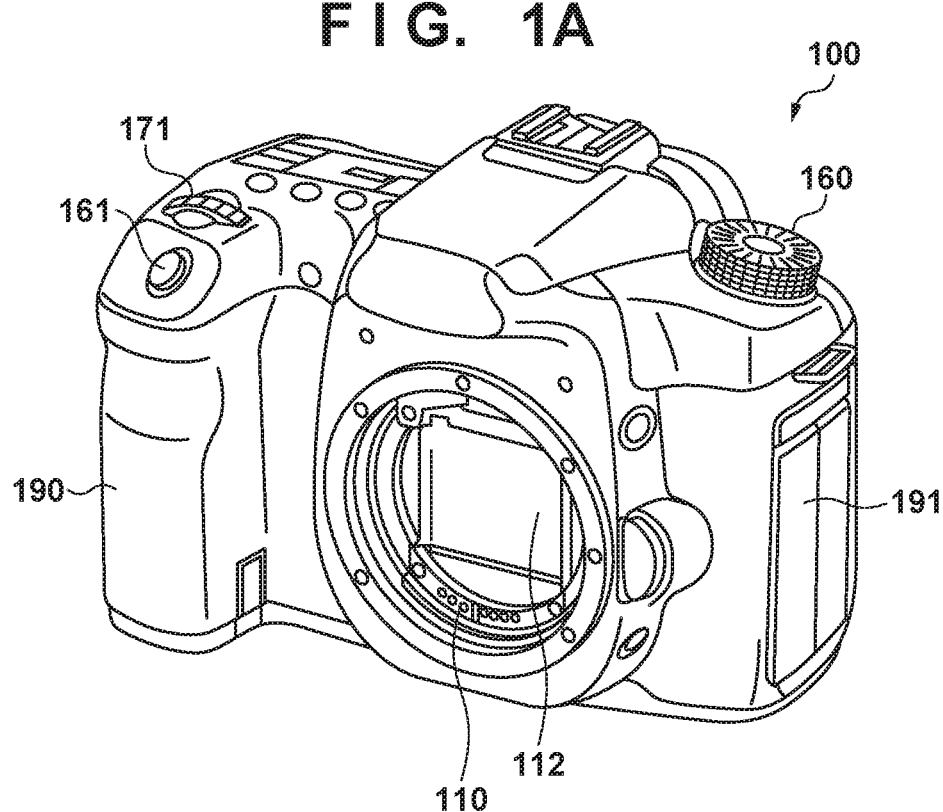
FIG. 1A is a perspective view illustrating an example of the external appearance of a digital camera according to embodiments of the present invention.
Figure 1B:
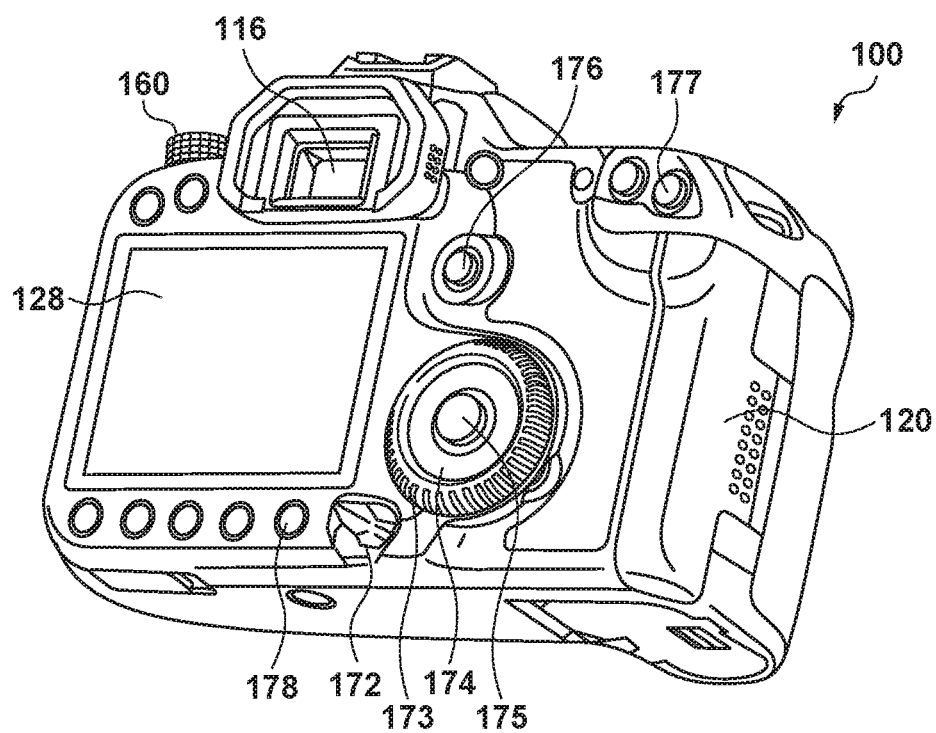
FIG. 1B is a perspective view illustrating an example of the external appearance of the digital camera according to embodiments of the present invention.

FIG. 1A and FIG. 1B are perspective views illustrating the external appearance of a digital single-lens reflex camera 100 (called simply a "camera 100" hereinafter), which is an example of an electronic apparatus according to the present embodiment, viewed from the upper-front and the lower-back, respectively.

A display unit 128 provided on the back surface of the camera 100 is a touch display. The display unit 128 is used to display images that have been shot, various types of information such as setting values of the camera 100, and so on. The display unit 128 also functions as an operating unit that accepts touch operations. If the device has a separate viewfinder, as is the case with the camera 100 according to the present embodiment, a touch sensor that does not have a display function, such as a touchpad, may be used instead of the display unit 128, or a touch sensor may be provided in a different position from the display unit 128. Here, the viewfinder may be an optical type or an electronic type. If the device does not have the display unit 128, operations to be made on the touch display can be replaced with operations made on a touch sensor while looking through the viewfinder (that is, while viewing a display unit that can be seen through the eyepiece part of the viewfinder). The same applies in a device that detects when a user is looking through the viewfinder and inactivates the display in the display unit 128 while keeping the touch sensor function of the display unit 128 active.

A shutter button 161 is an operating unit for inputting a shooting preparation instruction, a shooting start instruction, and so on. A mode change switch 160 is an operating unit for changing a shooting mode and so on of the camera 100. A terminal cover 191 protects connectors for cables use to communicate with external devices. A dial 171 is used to change setting values such as shutter speed and aperture. A power switch 172 switches the power of the camera 100 on and off.

A dial 173 is used to move a selection frame, scroll forward and backward through displayed images, and so on. The dial 173 can also be pressed in the up, down, left, and right directions, and therefore also functions as a directional key 174; furthermore, a SET button 175 is provided at a rotational axis part of the dial 173. The directional key 174 is used to move the cursor, and the SET button 175 is used to accept selected items, input confirmation responses, and so on.

A live view (LV) button 176 is used to switch a live view display in the display unit 128 on and off when the camera 100 is in a still image shooting mode. When the camera 100 is in a moving image shooting mode, the LV button 176 is used to instruct moving image shooting (recording) to start and stop.

An enlarge button 177 is used to switch an enlarged mode of the live view display on and off, and to change the enlargement ratio. When the camera 100 is in a playback mode, the enlarge button 177 is used to increase the display magnification of a played-back image. A playback button 178 is used to switch the camera 100 between a shooting mode and the playback mode. When the playback button 178 is pressed in a shooting mode, the camera 100 transitions to the playback mode, and displays the most recent image recorded in a recording medium in the display unit 128.

And operable/closable cover 120 protects a part for holding the recording medium, as well as the recording medium held therein, from dust and the like. A grip part 190 is formed in a shape that makes it easy for a user to hold the camera 100 in one hand, and contains a battery therein. A mirror 112 is flipped up and down by an actuator controlled by a system control unit 150 (FIG. 3A), which switches the travel direction of a light beam from a lens unit. A terminal 110 makes contact with a terminal provided in the lens unit, which can be attached to and removed from the camera 100, and is used to supply power from the camera 100 to the lens unit, for communication between the camera 100 and the lens unit, and so on.

An eyepiece 116 is an ocular lens of an optical viewfinder. By looking through the eyepiece 116, a user can view images of objects formed by the lens unit as well as setting values such as shutter speed, aperture, ISO, and an AF frame.

(Remote Controller 200)

Figure 2:
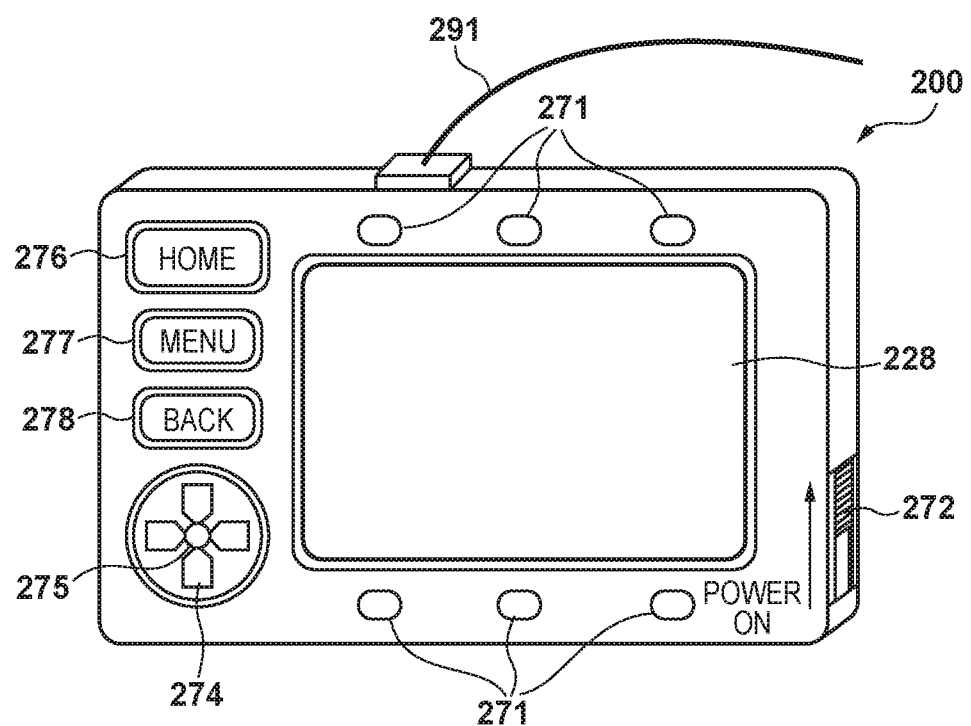
FIG. 2 is a perspective view illustrating an example of the external appearance of a remote controller according to embodiments.

FIG. 2 is a perspective view illustrating an example of the external appearance of a remote controller 200 (called simply a "remote 200" hereinafter) of the camera 100. The remote 200 is capable of remotely controlling the camera 100 by communicating with the camera 100. Although the remote 200 and the camera 100 can communicate over a wired medium or a wireless medium, the present embodiment assumes that wired communication is established using a connection cable 291. A connector of the connection cable 291 is connected to a connector within the terminal cover 191 of the camera 100. The connection cable 291 enables two-way communication between the camera 100 and the remote 200.

A power switch 272 switches the power of the remote 200 on and off. A display unit 228 is a touch display. Although the display unit 228 has the same aspect ratio as the display unit 128 of the camera 100, in the present embodiment, the camera 100 does not send live view images to the remote 200, and thus live view images are not displayed in the display unit 228.

The functions of operating buttons 271, three each of which are disposed above and below the display unit 228, change depending on the details displayed in the display unit 228. A directional key 274 includes keys corresponding to up, down, left, and right, and a SET button 275 is arranged in the center of the directional key 274. The directional key 274 is primarily used for inputting instructions to move a cursor, whereas the SET key 275 is primarily used to input instructions to execute and accept selected items. A HOME button 276 is used to instruct the remote 200 to transition to a HOME screen. A MENU button 277 is used to instruct the remote 200 to transition to a MENU screen. A BACK button 278 is used to make cancellation instructions, instruct a transition to a previous screen, and so on. The various keys and buttons 271 and 273 to 278 aside from the power switch 272 are included in an operating unit 270 of the remote 200 (FIG. 3B).

(Functional Configurations of Camera and Remote)

Figure 3A:
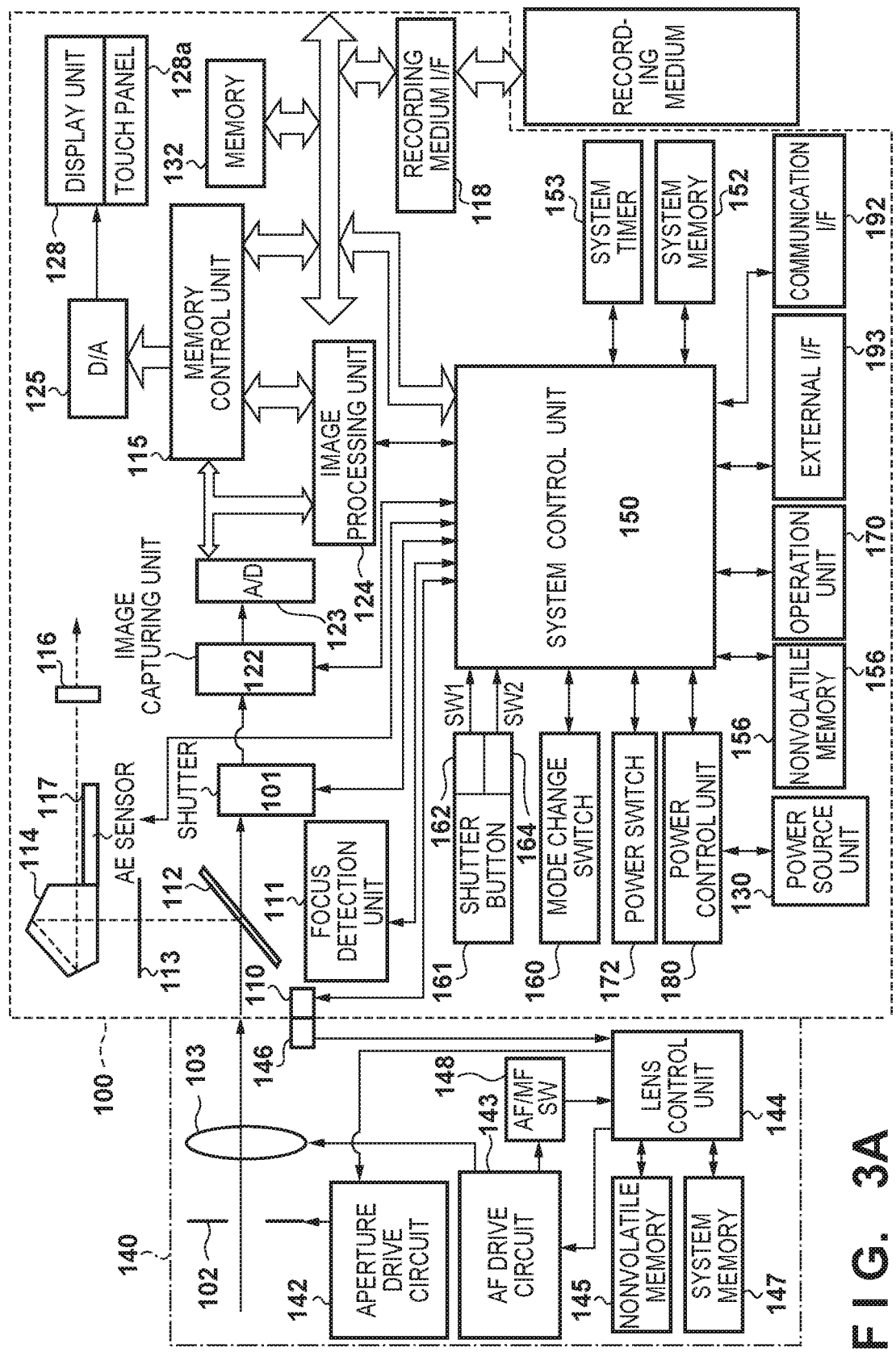
FIG. 3A is a block diagram illustrating an example of the functional configuration of the digital camera according to embodiments.

FIGS. 3A and 3B are block diagrams illustrating examples of the functional configurations of the camera 100 and the remote 200, respectively, where the same reference numerals are appended to the constituent elements illustrated in FIGS. 1A to 2. A lens unit 140 (called simply a "lens 140" hereinafter) is an interchangeable lens that can be attached to and detached from the camera 100. The lens 140 has a lens group 103 including mobile lenses such as a focus lens and a zoom lens. A terminal 146 makes contact with the terminal 110 when the lens 140 is attached to the camera 100, and enables two-way communication between the lens 140 and the camera 100, the supply of power from the camera 100 to the lens 140, and so on.

A lens control unit 144 is a programmable processor such as a CPU or an MPU, and controls operations of the lens 140 by loading a program stored in nonvolatile memory 145 into system memory 147 and executing the program. By communicating with the system control unit 150 via the terminals 146 and 110, the lens control unit 144 controls an aperture mechanism 102 through an aperture drive circuit 142, and controls positions of the mobile lenses in the lens group 103 through an AF drive circuit 143. An AF/MF switch (SW) 148 is a switch that switches between whether or not an autofocus function of the lens 140 will be used, and the setting value thereof is communicated to the system control unit 150 from the lens control unit 144. Note that there are also lenses 140 that do not have the AF/MF switch 148.

In the camera 100, a focusing screen 113, a pentaprism 114, and an ocular lens 116 constitute the optical viewfinder. A user can confirm a shooting range, a focus position, and so on by observing an object image, formed on the focusing screen 113 of the optical viewfinder, through the pentaprism 14 and the ocular lens 116. An AE sensor 117 provided within the optical viewfinder measures the brightness of the object image formed by the lens 140.

A focus detection unit 111 has an AF sensor that pupil-divides the lens 140, and outputs defocus information (direction and amount) to the system control unit 150. The system control unit 150 communicates a movement amount and movement direction of the focus lens to the lens control unit 144 on the basis of the defocus information. The lens control unit 144 uses the AF drive circuit 143 to move the focus lens 140 by the communicated direction and amount.

A quick-return mirror 112 (called simply a "mirror 112" hereinafter) switches the travel direction of a light beam entering from the lens 140 between the direction of the optical viewfinder and the direction of an image capturing unit 122. FIG. 3A illustrates a state where the mirror 112 is down, and thus the light beam travels in the direction of the optical viewfinder. When the image capturing unit 122 is exposed (when shooting a still image, capturing for live view, or shooting a moving image to be recorded), the mirror 112 is flipped up, and the light beam travels in the direction of the image capturing unit 122. The mirror 112 has a half mirror area so that the focus detection unit 111 can receive some of the light beam when the mirror 112 is down.

A mechanical shutter 101 opens and closes under the control of the system control unit 150, and exposes the image capturing unit 122 for a prescribed amount of time. Note that the mechanical shutter 101 is continuously open while using an electronic shutter, such as when shooting a moving image.

The image capturing unit 122 includes an image sensor, having a plurality of pixels, that converts an optical image into an electrical signal through photoelectric conversion. An A/D converter 123 converts an analog signal generated by the image capturing unit 122 into digital data.

An image processing unit 124 applies prescribed image processing to data from the A/D converter 123 or from a memory control unit 115. Demosaicing, white balance adjustment, tone correction, scaling (resizing), color conversion, encoding, decoding, area detection, and so on are example of the image processing, but the image processing is not limited thereto. "Area detection" is a process of detecting an area that meets a predetermined condition, such as an area having a specific pattern or feature (e.g. the face of a person or an animal, an area having a specific color or brightness, and so on), in an image, and is also called "object detection". A process of recognizing a person, detecting facial expressions, closed eyes, and red eye, and the like can also be carried out using the image processing unit 124. The following assumes that the image processing unit 124 executes a facial detection process, which detects a person's face, as an example of the object detection.

The image processing unit 124 can also generate control information from an image obtained through shooting (a captured image). For example, when using contrast AF, the image processing unit 124 can generate an AF evaluation value at a focus detection area and provide that value to the system control unit 150. The image processing unit 124 may generate a brightness evaluation value, generate a brightness histogram, and so on as well. Furthermore, the image processing unit 124 can detect a movement destination of a predetermined image area between a plurality of images obtained through sequential shooting (e.g. a plurality of moving image frames) The movement direction and movement amount of a specific area between images can employ a known method such as a process of detecting a motion vector using template matching, but is not limited thereto. For example, setting the focus detection area (AF frame) as a template makes it possible to track the AF frame, which enables tracking AF, which will be described later, to be implemented.

The digital data output by the A/D converter 123 is written into memory 132 via, of the image processing unit 124 and the memory control unit 115, at least the memory control unit 115. In addition to the digital data output by the A/D converter 123, the memory 132 stores image data read out from a recording medium 185 and the like. The memory 132 has a storage capacity sufficient for functioning as buffer memory during continuous shooting and the like.

The memory 132 also serves as video memory, and stores images displayed in the display unit 128, image (OSD) data expressing various types of information such as camera setting values, and the like as well. A D/A converter 125 converts the data of a display image stored in the memory 132 (a captured image and an OSD-combined image) into an analog signal and supplies that analog signal to the display unit 128, and the display image is displayed in the display unit 128.

The display unit 128 is, for example, a touch display including a touch panel 128a provided upon the screen. The position detection system of the touch panel 128a is not limited, and an electrostatic capacitance touch panel can be used, for example. Although the touch panel 128a is indicated as being an entity separate from the display unit 128 in the drawings for the sake of simplicity, it should be noted that touch panel functionality may be built into the display unit 128, as will an in-cell touch display. The display unit 128 can be made to function as an EVF by displaying a moving image in the display unit 128 as the moving image is being shot. The image displayed when the display unit 128 is made to function as an EVF is called a "live view image".

Nonvolatile memory 156 is memory that can be erased and recorded to electrically, such as EEPROM. The nonvolatile memory 156 stores programs executed by the system control unit 150, various types of setting values, GUI data, and the like.

The system control unit 150 is a programmable processor such as a CPU or an MPU, and controls operations of the camera 100 by loading a program stored in the nonvolatile memory 156 into system memory 152 and executing the program. The system control unit 150 also carries out display control by controlling the memory 132, the D/A converter 125, and the display unit 128.

The system control unit 150 carries out an automatic exposure control (AE) process based on brightness information obtained from the AE sensor 117 and an automatic focus detection (AF) process based on the defocus information obtained from the focus detection unit 111. The system control unit 150 also uses information obtained by the image processing unit 124 in the AE process, the AF process, and so on as necessary. For example, by using a result of facial area detection from the image processing unit 124, the system control unit 150 can carry out an AF process in which the focus detection area (AF frame) is set to a person's face, an AE process or flash adjustment that appropriately exposes the person's face, and so on. The system control unit 150 can also carry out AF that tracks movement of a face (tracking AF) by causing the image processing unit 124 to track an area corresponding to a specific face. Furthermore, when carrying out contrast AF, the system control unit 150 can shoot while varying the position of the focus lens to search for the focus lens position where the AF evaluation value obtained by the image processing unit 124 is the highest.

A system timer 153 measures times used in various types of control, measures the time of an internal clock, and so on.

The mode change switch 160 switches an operating mode of the camera 100 among a still image recording mode, a moving image recording mode, a playback mode, and so on. The still image recording mode includes an auto shooting mode, an auto scene determination mode, a manual mode, an aperture priority mode (Av mode), a shutter speed priority mode (Tv mode), a scene mode, a program AE mode, a custom mode, and so on. The scene mode is a mode in which parameters based on the type of a shot scene, such as sports, snowy scenes, or fireworks, are set automatically. The change switch 160 may be capable of selecting at least one of these modes. Alternatively, the still image shooting mode may be selected by the mode change switch 160, after which one of the plurality of modes included in the still image shooting mode is selected using another operating member. The moving image shooting mode may also include a plurality of modes.

A first shutter switch 162 turns on and emits a first shutter switch signal SW1 when the shutter button 161 is depressed halfway. Taking the first shutter switch signal SW1 as an instruction for shooting preparations, the system control unit 150 starts operations such as AF processing and AE processing. A second shutter switch 164 turns on and emits a second shutter switch signal SW2 when the shutter button 161 is fully depressed. Taking the second shutter switch signal SW2 as an instruction to start shooting, the system control unit 150 starts a series of shooting/recording processes, from the exposure and readout of the image capturing unit 122 to the generation of image data and the writing of the image data into the recording medium 185.

An operating unit 170 is indicated as a collection of the operating members illustrated in FIGS. 1A to 1B (the dial 171 to the enlarge button 177). The functions of these operating member may be assigned dynamically depending on the details displayed in the display unit 128, for example.

For example, functions of a menu button, an end button, a return button, a next image button, a jump button, a sort button, an attribute change button, and so on may be assigned. When, for example, the menu button is operated, the system control unit 150 causes a menu screen for a user to make various types of settings to be displayed in the display unit 128. The user can make various settings, input instructions, and so on from the menu screen by operating the directional key 174 and the SET button 175 together, or by operating the touch panel 128*a*, for example. Note that Operations to be carried out in response to the buttons or keys included in the operating unit 170 being operated can be set in advance in accordance with the screens displayed in the display unit 128 and stored in the nonvolatile memory 156. These settings may be changeable by the user.

A power control unit 180 is constituted by a battery detection circuit, a DC-DC converter, switch circuits for switching the blocks to be powered, and so on, and detects whether or not a power source is connected, the type of the power source, the remaining battery power, and so on. The power control unit 180 also controls the DC-DC converter on the basis of these detection results and under the control of the system control unit 150, and supplies a necessary voltage for a necessary period to the various units, including the recording medium 185.

A power source unit 130 may be a primary battery, a secondary battery, or an AC adapter. A recording medium I/F 118 is an interface for the recording medium 185. The recording medium 185 is a memory card, a hard disk, or the like. A removable recording medium and a built-in recording medium may be present as well.

An external I/F 193 is a communication interface with an external device, and includes connectors for connecting cables. The external I/F 193 includes, for example, a USB interface for connecting to a personal computer or the like, HDMI (trade name) for connecting to an external monitor, an interface for the remote 200, and the corresponding connectors. A communication I/F 192 is a communication interface with an external device, and includes an antenna for wireless communication, a modulation/demodulation circuit, and so on. The communication I/F 192 includes antennae and circuits for wireless communication based on standards such as wireless LAN and Bluetooth (trade name).

In the present embodiment, the system control unit 150 can set the focus detection area (AF frame) to a fixed position, an object area, or a desired position specified by the user and execute automatic focus detection (AF). The fixed position may be the center of the screen, for example. The object area may be a facial area detected in a live view image by the image processing unit 124, for example. The desired position specified by the user may be a position in the image specified by, for example, using the directional key 174 and the SET button 175 together, or by a touch operation made on the touch panel 128*a*. Setting the AF frame to a position specified through a touch operation and executing AF will be called "touch AF" hereinafter.

Serving as touch detection means, the system control unit 150 can detect the following operations made on, or states of, a touch sensing surface of the touch panel 128*a* (the display surface of the display unit 128).

When a finger or pen that had not been touching the touch panel 128*a* newly touches the touch panel 128*a*. In other words, this is the start of a touch (called "touch-down" hereinafter).

When a finger or pen is touching the touch panel 128*a* (called "touch-on" hereinafter).

When a finger or pen is moved while touching the touch panel 128*a* (called "touch-move" hereinafter).

When a finger or pen that had been touching the touch panel 128*a* is removed. In other words, this is the end of a touch (called "touch-up" hereinafter).

When nothing is touching the touch panel 128*a* (called "touch-off" hereinafter).

When a touch-down is detected, a touch-on is detected at the same time. A touch-on normally continues to be detected after a touch-down as long as no touch-up is detected. A touch-move being detected is also a state in which a touch-on is detected. Even if a touch-on is detected, a touch-move is not detected as long as the touched position does not move. A touch-off occurs after a touch-up has been detected for all fingers or pens that had been touching.

These operations/states, positional coordinates on the touch panel 128*a* where the finger or pen had been touching, and so on are communicated to the system control unit 150 through an internal bus. The system control unit 150 determines what type of operation (touch operation) has been made on the touch panel 128*a* on the basis of the communicated information. With respect to a touch-move, the movement direction of the finger or pen moving on the touch panel 128*a* can be determined on the basis of changes in the positional coordinates, for each of a vertical component and a horizontal component on the touch panel 128*a*.

A slide operation (drag operation) is determined to have been carried out if a touch-move of greater than or equal to a prescribed distance has been detected. If, while touching the touch panel 128*a*, a finger or pen is quickly moved a short distance and then removed, the operation is called "flicking". In other words, a "flick" is an operation of quickly flicking a finger on the touch panel 128*a*. A flick can be determined to have been carried out if a touch-move of greater than or equal to a prescribed distance and at greater than or equal to a prescribed speed is detected and a touch-up is then detected (it can be determined that a flick occurred continuing from a slide operation).

Furthermore, when a plurality of locations (two points, for example) are touched at the same time, and the touched positions are brought together, the touch operation is called a "pinch-in", whereas when the touched positions are moved apart, the touch operation is called a "pinch-out". Pinch-out and pinch-in are collectively referred to as pinch operations (or simply "pinching"). Any of a variety of types of touch panels, such as resistive film, electrostatic capacitance, surface elastic wave, infrared, electromagnetic induction, image recognition, and photodetector, may be used as the touch panel 128*a*. Depending on the type, a touch is detected when contact is made with the touch panel, or a touch is detected when a finger or pen has approached the touch panel, and either of these types may be used.

The remote 200 will be described next.

Nonvolatile memory 256 is memory that can be erased and recorded to electrically, such as EEPROM. The nonvolatile memory 256 stores programs executed by a remote controller control unit 250, various types of setting values, GUI data, and the like.

The remote controller control unit 250 is a programmable processor such as a CPU or an MPU, and controls operations of the remote 200 by loading a program stored in the nonvolatile memory 256 into system memory 252 and executing the program.

Memory 232 is used as video memory for the display unit 228, and the remote controller control unit 250 stores display image data therein. A display image is displayed in the display unit 228 by converting the display image data stored in the memory 232 into an analog signal using a D/A converter 213 and supplying that analog signal to the display unit 228. The remote controller control unit 250 also carries out display control by controlling the memory 232, the D/A converter 213, and the display unit 228.

The display unit 228 is a touch display including a touch panel 228a provided upon the screen. Like the touch panel 128a of the camera 100, the type of the touch panel 228a is not limited. Additionally, touch panel functionality may be built into the display unit 228.

A system timer 253 measures times used in various types of control, measures the time of an internal clock, and so on.

The operating unit 270 collectively indicates the various keys and buttons 271 and 273 to 278 indicated in FIG. 2, aside from the power switch 272. The functions of the operating buttons 271 may be assigned dynamically, and the names or the like of the functions currently assigned may be displayed in the display unit 228. An end button, a return button, a next image button, a jump button, a sort button, an attribute change button, and so on can be given as examples of the assigned functions, but the functions are not limited thereto.

When the HOME button 276 is pressed, the remote controller control unit 250 reads out GUI data from the nonvolatile memory 256 and causes a predetermined HOME screen to be displayed in the display unit 228. Likewise, when the MENU button 277 is pressed, the remote controller control unit 250 reads out GUI data from the nonvolatile memory 256 and causes a predetermined MENU screen to be displayed in the display unit 228.

The remote controller control unit 250 also controls the display in accordance with the screen, e.g. moves the focus in a GUI screen (a highlighted display of a selected item) in response to the directional key 274 being operated. When the SET button 275 is operated, the remote controller control unit 250 executes processing, changes screens, or the like in accordance with the item selected at that point in time. Operations to be carried out in response to the buttons or keys included in the operating unit 270 being operated can be set in advance in accordance with the screens displayed in the display unit 228 and stored in the nonvolatile memory 256. These settings may be changeable by the user.

A power control unit 280 is constituted by a battery detection circuit, a DC-DC converter, switch circuits for switching the blocks to be powered, and so on, and detects whether or not a power source is connected, the type of the power source, the remaining battery power, and so on. The power control unit 280 also controls the DC-DC converter on the basis of these detection results and under the control of the system control unit 150, and supplies a necessary voltage for a necessary period to the various units.

A power source unit 230 may be a primary battery, a secondary battery, or an AC adapter. An external I/F 293 is a communication interface with the camera 100, and a cable 291 is connected thereto. The communication with the camera 100 is carried out through the external I/F 293 under the control of the remote controller control unit 250. A communication I/F 292 is a communication interface with an external device, and includes an antenna for wireless communication, a modulation/demodulation circuit, and so on. The communication I/F 292 includes antennae and circuits for wireless communication based on standards such as wireless LAN and Bluetooth (trade name).

The remote controller control unit 250 can detect whether or not the touch sensing surface of the touch panel 228a (the display surface of the display unit 228) has been touched, a change in the touched position over time (speed), and so on, and can thus recognize various touch operations. It is assumed here that the remote controller control unit 250 can recognize the same touch operations as the above-described system control unit 150.

(Description of Operations—Camera 100)

Next, operations carried out in the image capturing system illustrated in FIGS. 3A and 3B while the camera 100 shoots and displays a live view image, such as during a shooting standby state or while recording a moving image, will be described using FIGS. 4AA to 4CB. The operations indicated in the flowcharts of FIGS. 4AA to 4CB are realized by the system control unit 150 loading a program stored in the nonvolatile memory 156 into the system memory 132 and executing the program to control the various units of the camera 100.

Of the operations described hereinafter, inputs from the remote 200 may be inputs from the operating unit 170 of the camera 100 (including the touch panel 128a and the AF/MF switch 148 of the lens 140). Furthermore, processes involving output to the remote 200 need not be carried out when the remote 200 is not connected or when the remote 200 is disabled.

In S4001, the system control unit 150 determines whether or not a request to change the AF mode has been received from the remote 200 via the external I/F 193 (or from the operating unit 170). If the request has been received, the process moves to S4002, and if the request has not been received, the process moves to S4003. In the present embodiment, "AF mode" means the operational state of autofocus (AF). A "request to change the AF mode" means a request affecting the operational state of AF, e.g. a request to change parameter values. In the present embodiment, setting whether or not to activate facial detection, setting a target for object tracking, instructing tracking to start and stop, instructing a switch between manual focus (MF) and autofocus, and the like can be given as specific examples of requests to change the AF mode, but the request is not limited thereto.

In the present embodiment, if facial detection is active, the user can select an object to focus on. The user can also select the position of the area where focus detection is to be carried out (the AF frame). Furthermore, tracking AF, in which AF is carried out while tracking a primary object selected by the user (an object at the position of the facial area or the AF frame), can be carried out, and the user can start and stop the tracking AF, change the area to be tracked, and so on.

In S4002, the system control unit 150 changes the AF mode in response to the AF mode change request. The system control unit 150 can change the AF mode by changing parameter values corresponding to the current AF mode, held in the system memory 152, for example.

In S4003, the system control unit 150 determines whether or not the current AF mode is a tracking standby state by referring to the system memory 152; if the mode is the tracking standby state, the process moves to S4016, and if the mode is not the tracking standby state, the process moves to S4004.

Figure 4A:
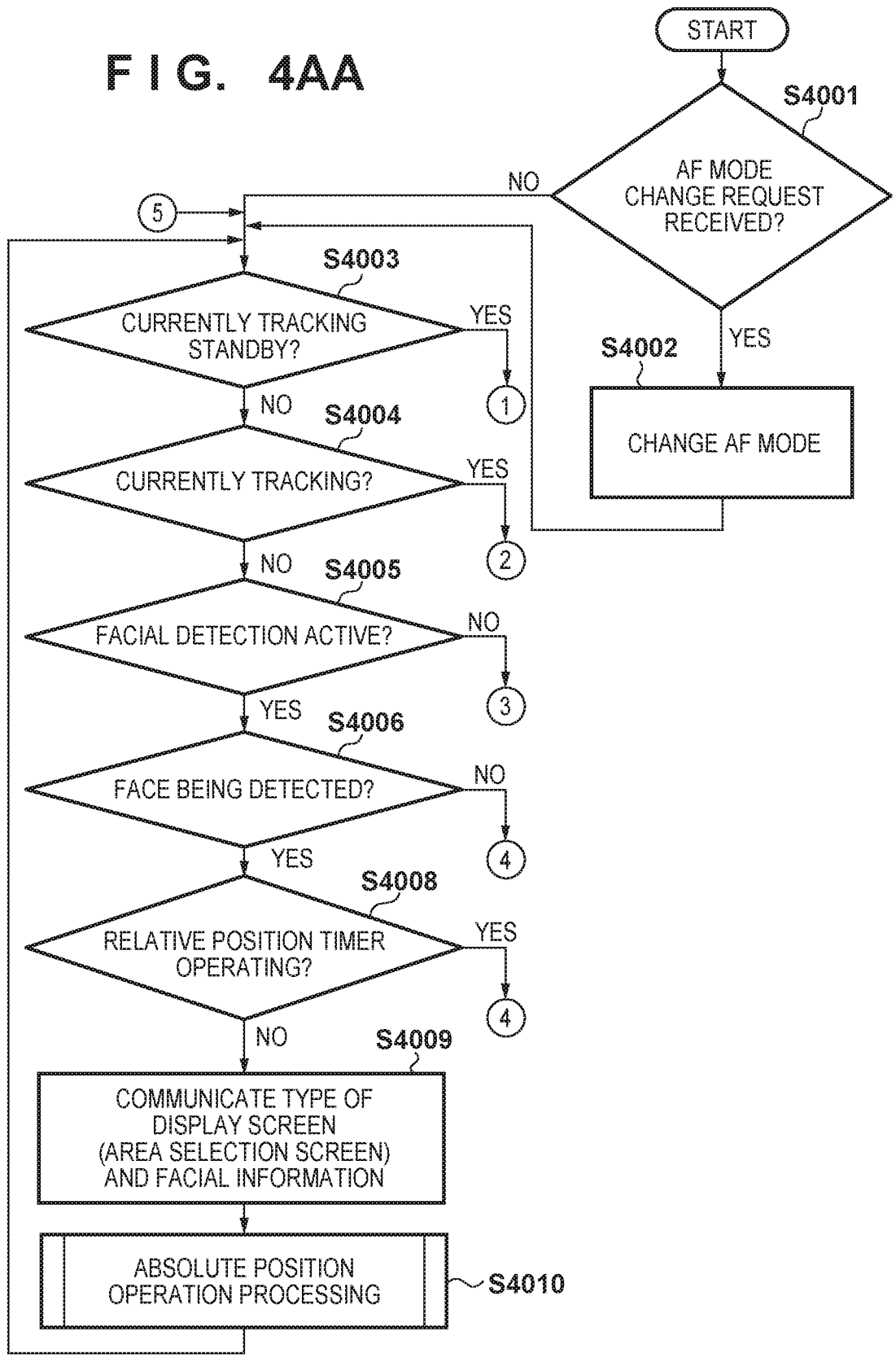
FIG. 4AA is a flowchart pertaining to operations of the digital camera according to embodiments.
Figure 4A:
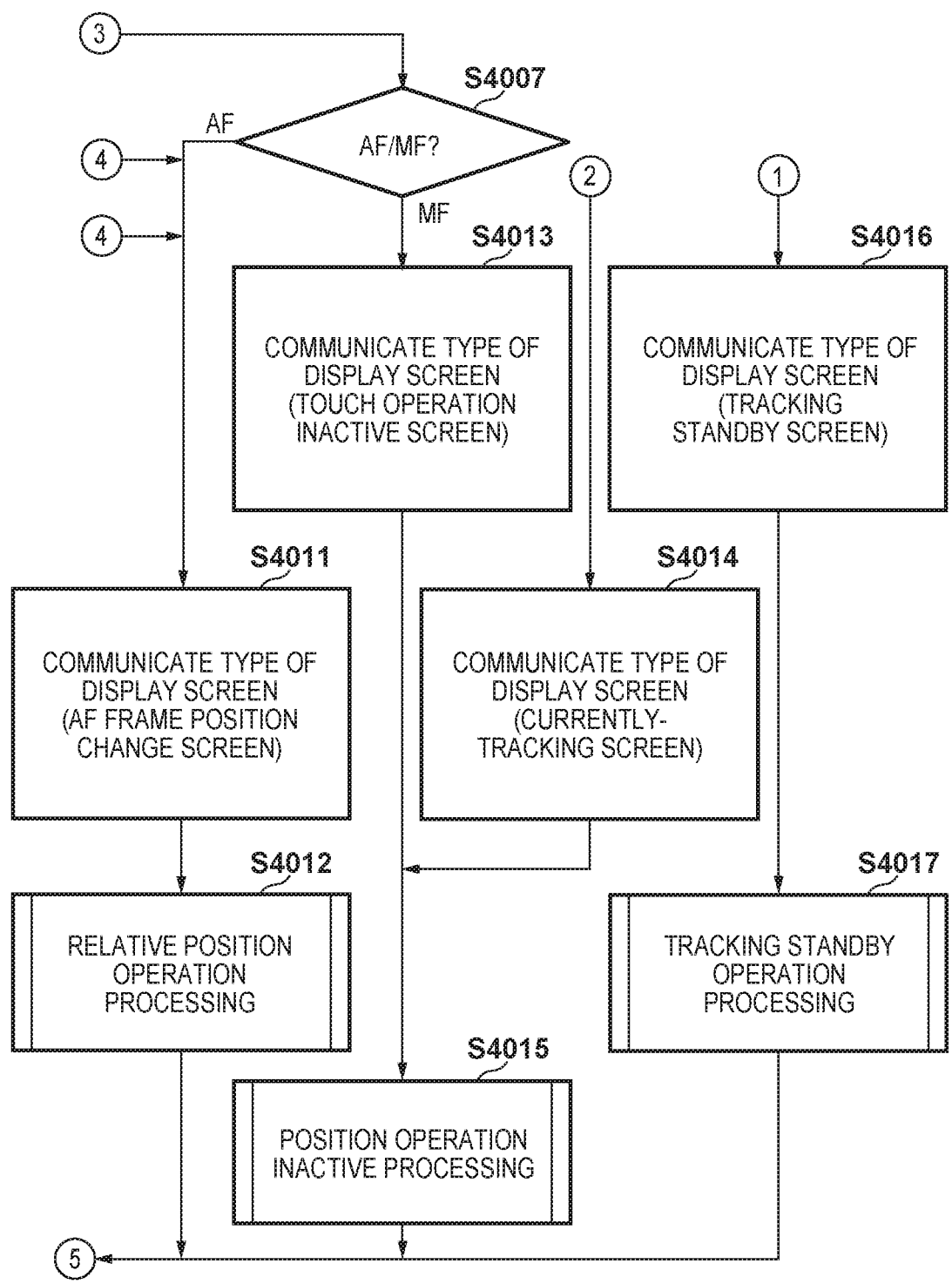

In S4004, the system control unit 150 determines whether or not the current AF mode is a currently-tracking state by referring to the system memory 152; if the mode is the currently-tracking state, the process moves to S4014 of FIG. 4AB, and if the mode is not the currently-tracking state, the process moves to S4005.

In S4005, the system control unit 150 determines whether or not the current AF mode has facial detection active by referring to the system memory 152; if facial detection is active, the process moves to S4006, and if facial detection is not active, the process moves to S4007 of FIG. 4AB.

In S4006, the system control unit 150 determines whether or not a face is detected in an image frame captured by the image capturing unit 122; if a face is detected, the process moves to S4008, and if a face is not detected, the process moves to S4011 of FIG. 4AB.

In S4007, the system control unit 150 determines whether or not the current AF mode is AF or MF by referring to the system memory 152; if the mode is AF, the process moves to S4011 of FIG. 4AB, and if the mode is MF, the process moves to S4013 of FIG. 4AB.

In S4008, the system control unit 150 determines whether or not a relative position timer realized by the system timer 153 is currently operating. The relative position timer is an example of means for measuring a set amount of time, and starts measurement (counting) in S4204, which will be described later, and then stops when the set amount of time has passed (when the count reaches a prescribed value (e.g. 0)). The system control unit 150 moves the process to S4011 if the relative position timer is currently operating, and moves the process to S4009 if the relative position timer is not currently operating.

In S4009, the system control unit 150 communicates, to the remote 200 via the external I/F 193, the type of the display screen (an area selection screen) and information of individual faces that have been detected (e.g. identification information, positions, and sizes). If a plurality of faces have been detected, the system control unit 150 sets one of the plurality of faces as a primary face in accordance with a predetermined condition, and communicates which face is the primary face to the remote 200. Although the condition for selecting the primary face is not particularly limited, one or more of conditions such as the face closest to the center of the screen, the largest face, the closest face, and so on can be used. If a face specified by the user as a primary face is detected, the system control unit 150 sets that face as the primary face. Rather than communicating the type of the display screen, the display screen data itself may be sent.

Figure 5A:
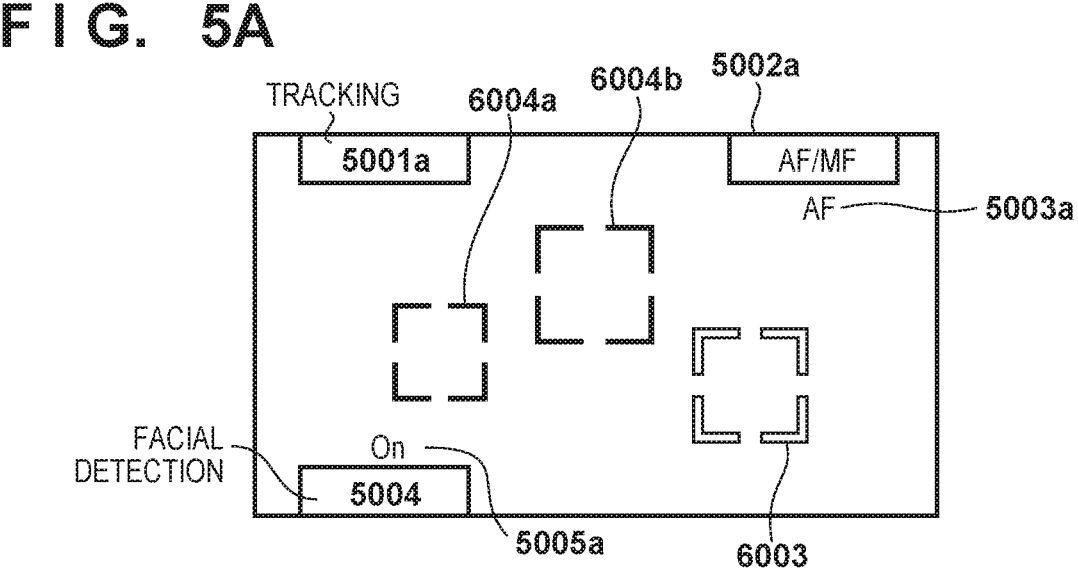
FIG. 5A is a diagram illustrating an example of a screen display in the remote controller according to embodiments.

FIG. 5A illustrates an example of the area selection screen displayed in the display unit 228 by the remote controller control unit 250 in response to the communication in S4009.

5001a is a guide display indicating that a function for instructing a transition to the tracking standby state is assigned to one of the devices included in the operating unit 270.

5002a is a guide display indicating that a function for instructing a switch between AF and MF is assigned to one of the devices included in the operating unit 270.

5003a is a display indicating the current focus mode of the camera 100, and in the example of FIG. 5A, indicates that the current focus mode is AF.

5004 is a guide display indicating that a function for instructing a switch between activating and deactivating facial detection is assigned to one of the devices included in the operating unit 270.

5005a is a display indicating whether the current facial detection function of the camera 100 is active or inactive, and in the example of FIG. 5A, indicates that the facial detection function is currently active.

6003, 6004a, and 6004b are facial frames displayed by the remote controller control unit 250 on the basis of the communicated facial information, and are examples of mark displays serving as indicators of the positions and sizes of detected faces. Here, three faces have been detected, and the display of the facial frame 6003 corresponding to the primary face is made different from the other facial frames 6004a and 6004b. Note that the remote controller control unit 250 displays the facial frame having converted the position, size, and so on of the facial area expressed by image coordinates in the facial information in accordance with the resolution of the display unit 228.

Note that the input devices included in the operating unit 270 are not particularly limited to devices corresponding to the guide displays 5001a to 5003a displayed at the edge parts of the display unit 228. The configuration may also be such that the guide displays 5001a to 5003a can be operated by touch directly using the touch panel 228a.

Thus when the screen illustrated in FIG. 5A is displayed, the user can carry out the following from the remote 200:
selecting an object (face)
instructing a transition to the tracking standby state
switching between AF and MF
switching facial detection between active and inactive In the present embodiment, the live view image is not displayed in the display unit 228 of the remote 200, but displaying the facial frame on the basis of the facial information makes it possible for the user to easily specify a desired face from the remote 200. The remote controller control unit 250 may display an area selection screen in which a facial frame is not displayed, as illustrated in FIG. 5F. In this case, the guide display 5006a for notifying the user of the function assigned to the touch panel 228a and the operation method can be made.

If a screen in which the area detected by the camera 100 can be selected is displayed in the display unit 228, such as the area selection screen of FIG. 5A, an absolute position operation on the touch panel 228a of the remote 200 is activated (that is, information of an operated position is activated).

Accordingly, in S4010, the system control unit 150 carries out processing of the absolute position operation, which will be described later using FIG. 4BA, and returns the process to S4003.

In S4011, the system control unit 150 communicates, to the remote 200 via the external I/F 193, the type of the display screen (an AF frame position change screen). Rather than communicating the type of the display screen, the display screen data itself may be sent.

Figure 5B:
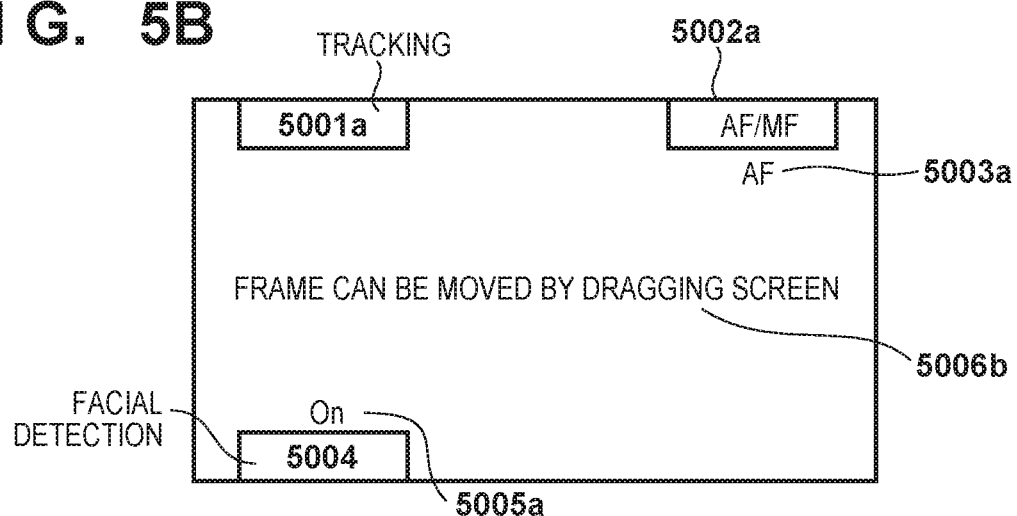
FIG. 5B is a diagram illustrating an example of a screen display in the remote controller according to embodiments.

FIG. 5B illustrates an example of the AF frame position change screen displayed in the display unit 228 by the remote controller control unit 250 in response to the communication in S4011. This screen indicates that the camera 100 is in a state of accepting an operation to move the AF frame. Display elements identical to those in FIG. 5A are given identical numbers, and descriptions thereof will be omitted.

5006b is a guide display indicating that, by making a drag operation on the touch panel 228a, the AF frame can be moved from its current position to a position corresponding to a direction and distance of the drag operation.

Thus with respect to a change in the position of the AF frame, a relative position operation on the touch panel 228a is activated instead of an absolute position operation (information of the direction and amount of an operation is activated).

In S4012, the system control unit 150 carries out processing of the relative position operation, which will be described later using FIG. 4BB, and returns the process to S4003.

In S4013, the system control unit 150 communicates, to the remote 200 via the external I/F 193, the type of the display screen (a touch operation inactive screen), and moves the process to S4015. Rather than communicating the type of the display screen, the display screen data itself may be sent.

Figure 5C:
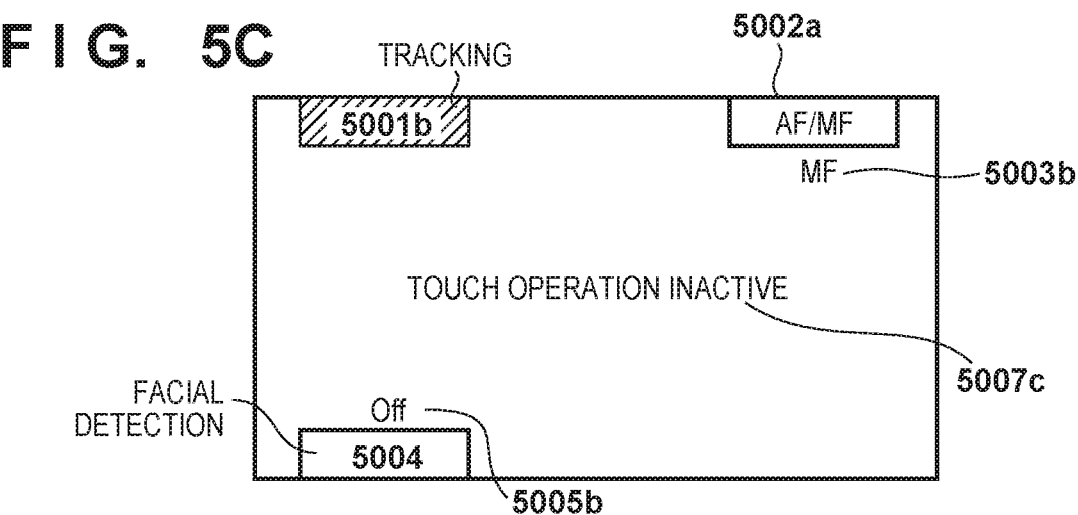
FIG. 5C is a diagram illustrating an example of a screen display in the remote controller according to embodiments.

FIG. 5C illustrates an example of the touch operation inactive screen displayed in the display unit 228 by the remote controller control unit 250 in response to the communication in S4013. This screen indicates that the camera 100 is in a state of not accepting operations pertaining to the AF frame or the facial frame. Display elements identical to those in FIG. 5A are given identical numbers, and descriptions thereof will be omitted.

In the example of FIG. 5C, the function for instructing a transition to the tracking standby state is inactive, and thus the guide display 5001b is displayed in, for example, a different color from when the function is active, as indicated in FIG. 5A.

5003b indicates that the current focus mode is MF.

5005b indicates that the current facial detection function is inactive.

5007c is a guide display indicating that operations on the touch panel 228a (aside from operations made to the guide displays 5002a and 5004) are inactive.

In S4014, the system control unit 150 communicates, to the remote 200 via the external I/F 193, the type of the display screen (a currently-tracking screen), and moves the process to S4015. Rather than communicating the type of the display screen, the display screen data itself may be sent.

Figure 5D:
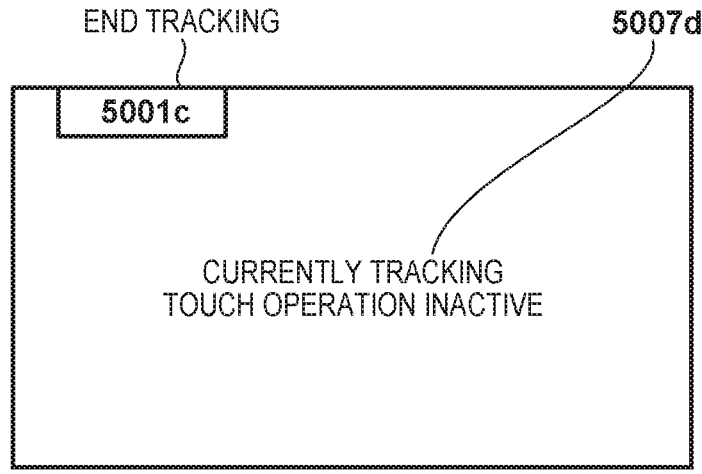
FIG. 5D is a diagram illustrating an example of a screen display in the remote controller according to embodiments.

FIG. 5D illustrates an example of the currently-tracking screen displayed in the display unit 228 by the remote controller control unit 250 in response to the communication in S4014. The currently-tracking screen is a screen indicating that the camera 100 is currently carrying out AF operations while tracking a selected object or AF frame (is in tracking AF), and that touch operations (aside from operation made to the guide display 5001c) are inactive.

5001c is a guide display indicating that a function for instructing tracking to end is assigned to one of the devices included in the operating unit 270.

5007d is a guide display indicating that the AF mode of the camera 100 is tracking AF, and that operations of the touch panel 228a are inactive.

In S4015, the system control unit 150 carries out processing of position operation deactivation, which will be described later using FIG. 4CA, and returns the process to S4003.

In S4016, the system control unit 150 communicates, to the remote 200 via the external I/F 193, the type of the display screen (a tracking standby screen), and moves the process to S4017. Rather than communicating the type of the display screen, the display screen data itself may be sent.

Figure 5E:
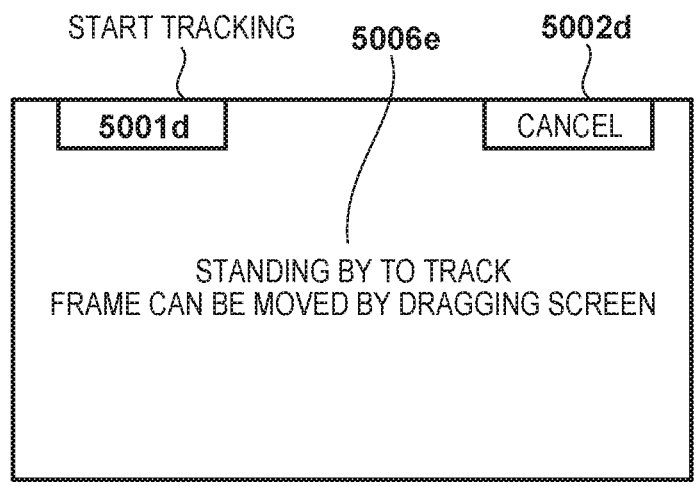
FIG. 5E is a diagram illustrating an example of a screen display in the remote controller according to embodiments.
Figure 5F:
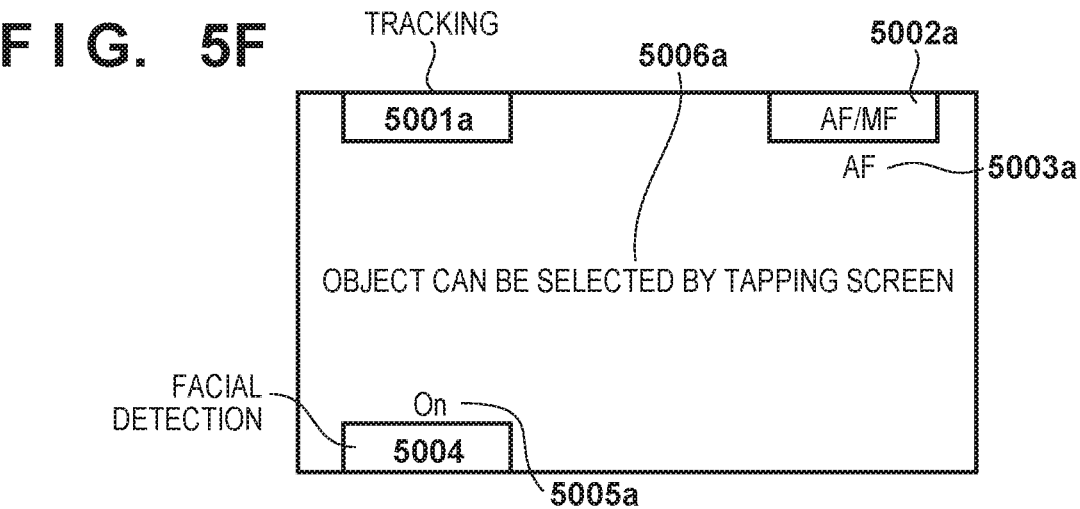
FIG. 5F is a diagram illustrating an example of a screen display in the remote controller according to embodiments.

FIG. 5E illustrates an example of the tracking standby screen displayed in the display unit 228 by the remote controller control unit 250 in response to the communication in S4016. The tracking standby screen is a screen indicating that the AF mode of the camera 100 is the tracking standby state and that a tracking standby frame can be moved through a drag operation.

5001d is a guide display indicating that a function for instructing tracking to start is assigned to one of the devices included in the operating unit 270.

5002h is a guide display indicating that a function for instructing tracking to be cancelled is assigned to one of the devices included in the operating unit 270.

5006e is a guide display indicating that the AF mode of the camera 100 is the tracking standby state and that, by making a drag operation on the touch panel 228a, the tracking standby frame can be moved from its current position to a position corresponding to a direction and distance of the drag operation. The tracking standby frame is a facial or AF frame on which tracking AF is to be carried out, and when an instruction to start tracking is made, the camera 100 starts the tracking AF by tracking the tracking standby frame at the point in time when the instruction was made.

In S4017, the system control unit 150 carries out processing of a tracking standby operation, which will be described later using FIG. 4CB, and returns the process to S4003.

Figure 4B:
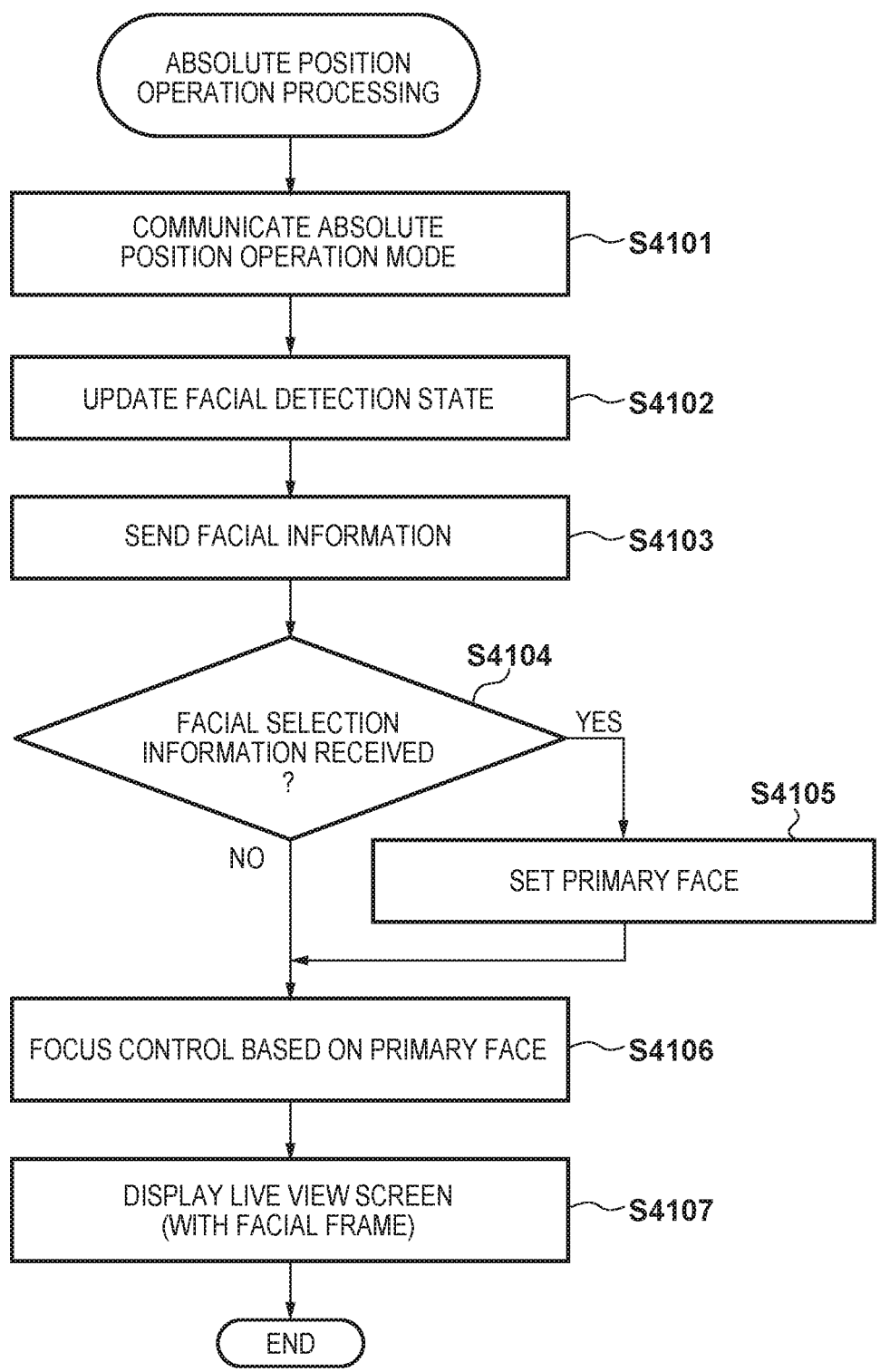
FIG. 4BA is a flowchart pertaining to operations of the digital camera according to embodiments.
Figure 4B:
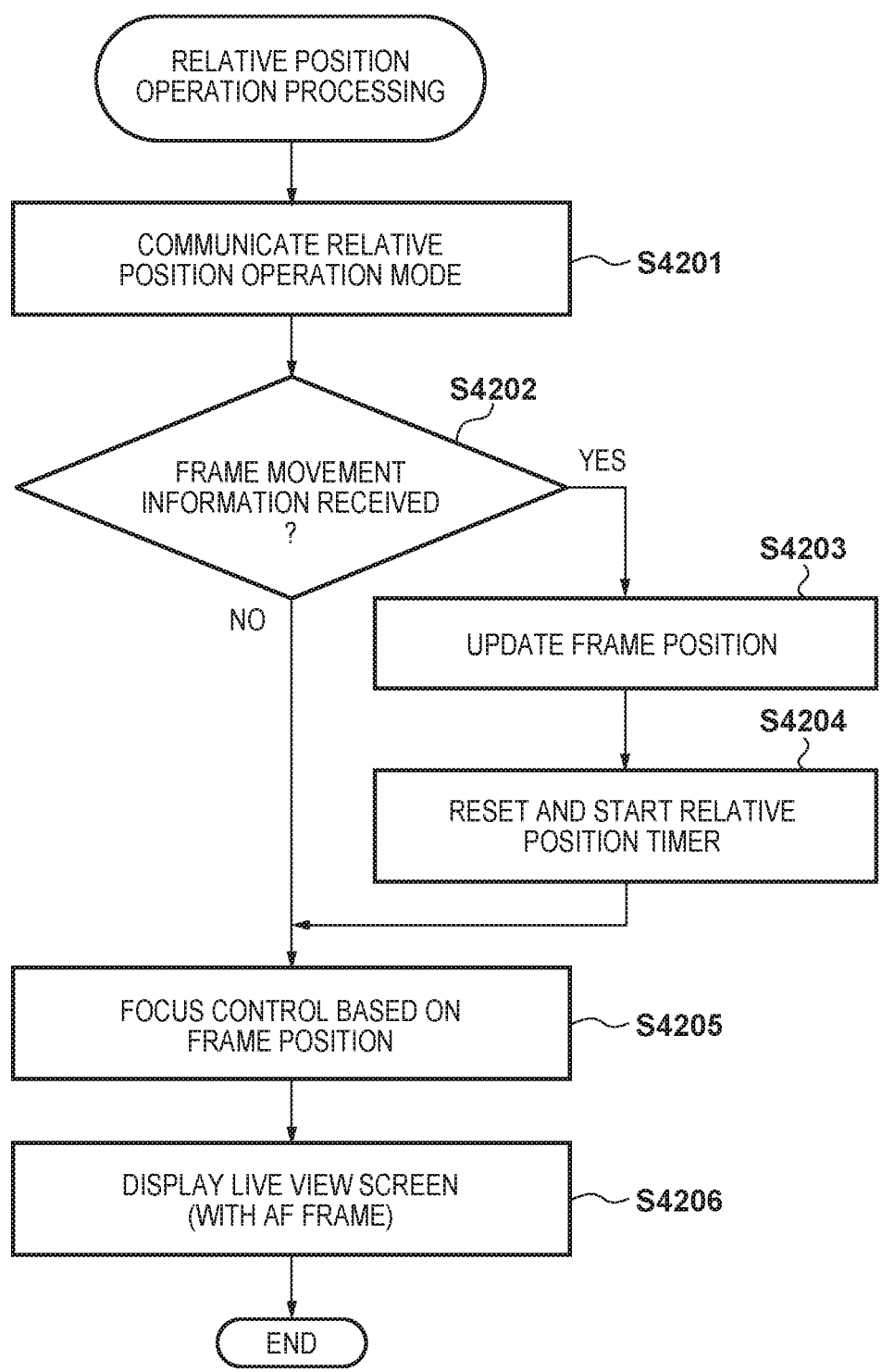

FIG. 4BA is a flowchart illustrating details of the process of the absolute position operation executed by the system control unit 150 in S4010.

In S4101, the system control unit 150 communicates, to the remote 200 via the external I/F 193, that the touch panel 228a is to be operated in an absolute position operation mode. The absolute position operation mode is a mode in which the position (coordinates) of a touch operation is active.

In S4102, the system control unit 150 updates the facial detection state as necessary.

In S4103, the system control unit 150 sends, to the remote 200 via the external I/F 193, the information (identification information, position, and size) the individual faces currently detected. Because the facial information is sent to the remote 200 in S4009, the processes of S4102 and S4103 need not be carried out. Additionally, the process of S4103 may be executed only in the case where the facial detection results in S4102 differs from those obtained when S4009 was executed.

In S4104, the system control unit 150 determines whether or not the identification information of a selected face has been received from the remote 200; if the information has been received, the process moves to S4105, and if the information has not been received, the process moves to S4107.

In S4105, the system control unit 150 sets the face corresponding to the facial identification information received in S4104 as the primary face and moves the process to S4106.

In S4106, the system control unit 150 sets the AF frame to an area containing the primary face, for example, carries out focus control (focus detection), and then moves the process to S4107.

Figure 6A:
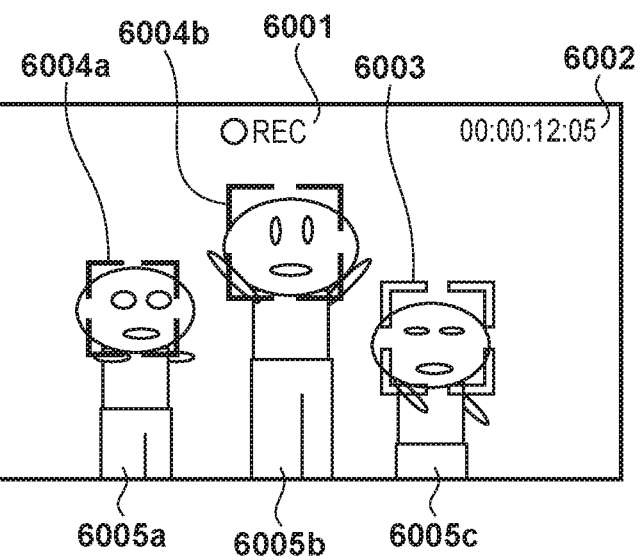
FIG. 6A is a diagram illustrating an example of a screen display in the digital camera according to embodiments.

In S4107, the system control unit 150 displays, in the display unit 128, a live view screen including, for example, a mark display indicating the detected face (the facial frame) as indicated in FIG. 6A, and then ends the processing of the absolute position operation.

6001 is a state display indicating that a moving image is being shot or moving image shooting is currently paused. This is not displayed during the shooting standby state. An example where the display indicates a moving image is being shot is shown here.

6002 is a display indicating a time code of the moving image being shot.

6003 is a frame display indicating the primary face among the detected faces.

6004a and 6004b are frame displays indicating faces, among the detected faces, that are not the primary face, and are displayed in a form different from that of the primary facial frame 6003.

6005a, 6005b, and 6005c are objects, present in the image captured by the image capturing unit 122, that correspond to targets of detection of the object detection process (peoples' faces, here).

FIG. 4BB is a flowchart illustrating details of the process of the relative position operation executed by the system control unit 150 in S4012.

In S4201, the system control unit 150 communicates, to the remote 200 via the external I/F 193, that the touch panel 228a is to be operated in a relative position operation mode. The relative position operation mode is a mode in which the movement amount and movement direction of a position in the touch operation are activated rather than a position in the touch operation.

In S4202, the system control unit 150 determines whether or not information pertaining to a movement amount and a movement direction of a touch operation (movement information) has been received from the remote 200; if the information has been received, the process moves to S4203, and if the information has not been received, the process moves to S4205.

In S4203, the system control unit 150 sets a movement destination position of the AF frame on the basis of the current position of the AF frame and the movement information received in S4202, and moves the process to S4204.

In S4204, the system control unit 150 resets the relative position timer, starts the count, and moves the process to S4205. As described above, the relative position tinier is a timer for measuring a set amount of time, and is realized using the system timer 153. The relative position timer may be a count-up timer or a count-down timer.

If the mode is frequently switch between the relative position operation mode and the absolute position operation mode, the position of the AF frame will move frequently, resulting in the execution of focus control not intended by the user. The set amount of time measured by the relative position timer is an amount of time for switching (transitioning) between relative position operation and absolute position operation, and approximately several seconds is thought of as appropriate for switching that does not impart a sense of unnaturalness. The system control unit 150 sets an initial value and a target value for the relative position timer and starts the count. Rather than measuring a set amount of time, the focus control entering a stable state in S4205 may be used as a condition for starting or stopping the count. Focus control that does not impart a sense of unnaturalness can be realized by ensuring that the touch panel 228a does not frequently switch between the relative position operation mode and the absolute position operation mode.

In S4205, the system control unit 150 carries out focus control on the basis of the current position of the AF frame, and then moves the process to S4206.

Figure 6B:
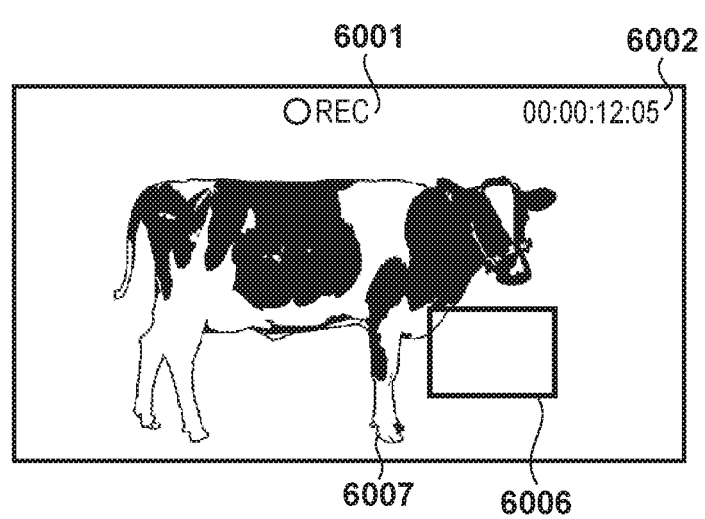
FIG. 6B is a diagram illustrating an example of a screen display in the digital camera according to embodiments.

In S4206, the system control unit 150 displays, in the display unit 128, a live view screen including, for example, a mark display indicating the current AF frame as indicated in FIG. 6B, and then ends the processing of the relative position operation. In FIG. 6B, display elements identical to those in FIG. 6A are given identical reference signs, and redundant descriptions thereof will be omitted.

6006 is a display indicating the current position of the AF frame.

6007 is an object in the image.

Figure 4C:
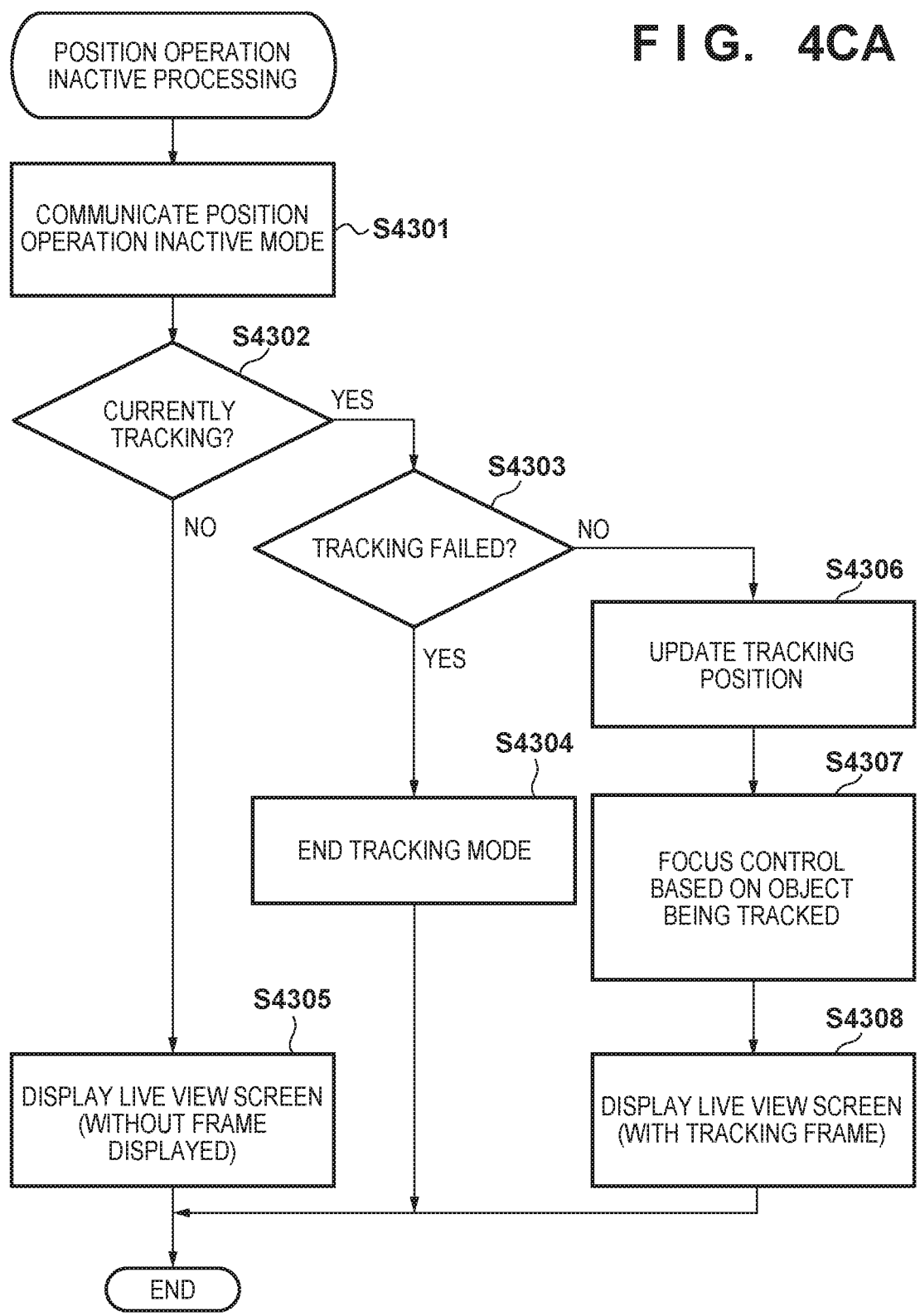
FIG. 4CA is a flowchart pertaining to operations of the digital camera according to embodiments.
Figure 4C:
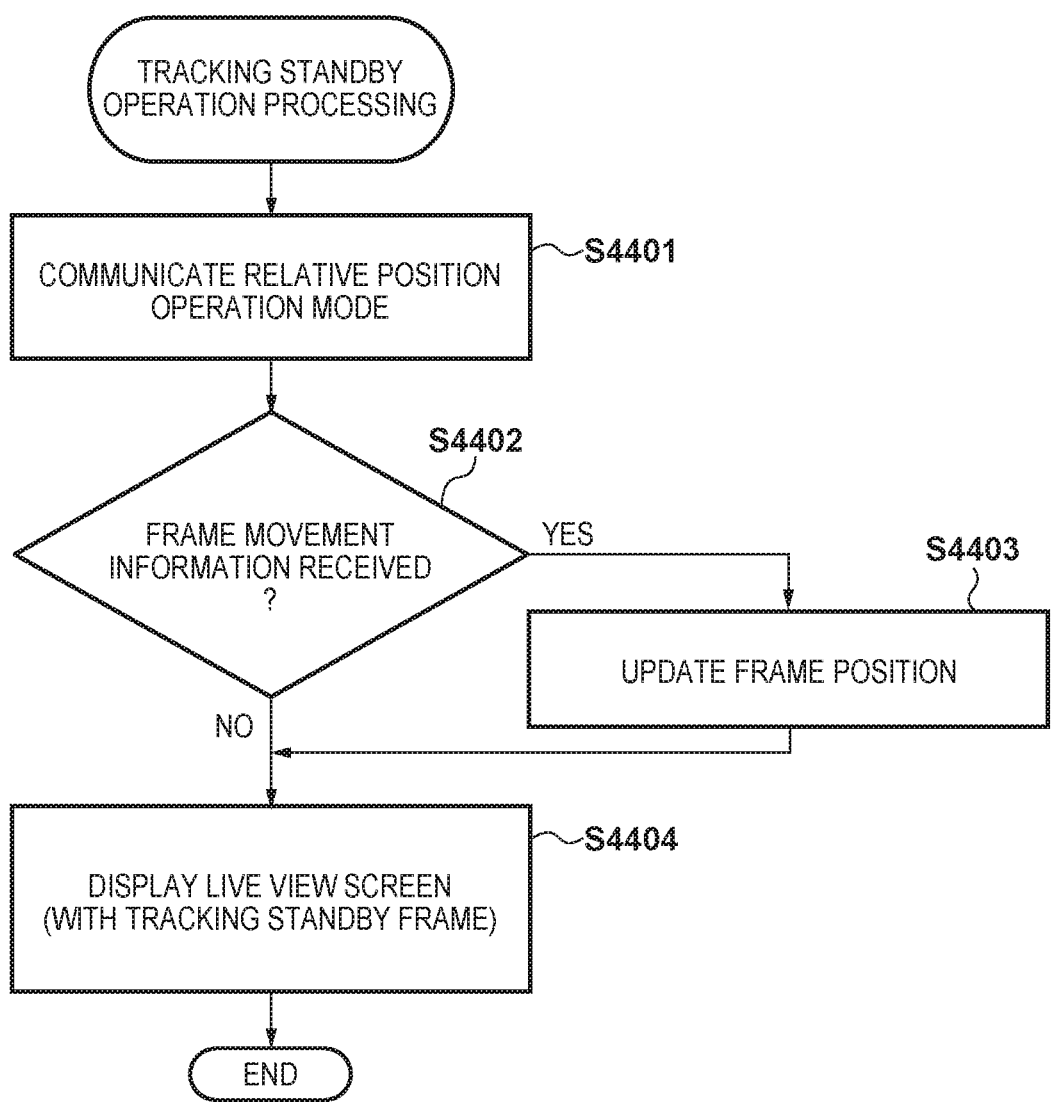

FIG. 4CA is a flowchart illustrating details of the process of the position operation deactivation executed by the system control unit 150 in S4015.

In S4301, the system control unit 150 communicates, to the remote 200 via the external I/F 193, that the absolute position operation and the relative position operation of the touch panel 228a are inactive.

In S4302, the system control unit 150 determines whether or not the AF mode is currently tracking, in the same manner as S4004; if the AF mode is tracking, the process moves to S4303, and if the AF mode is not tracking, the process moves to S4305.

Figure 6C:
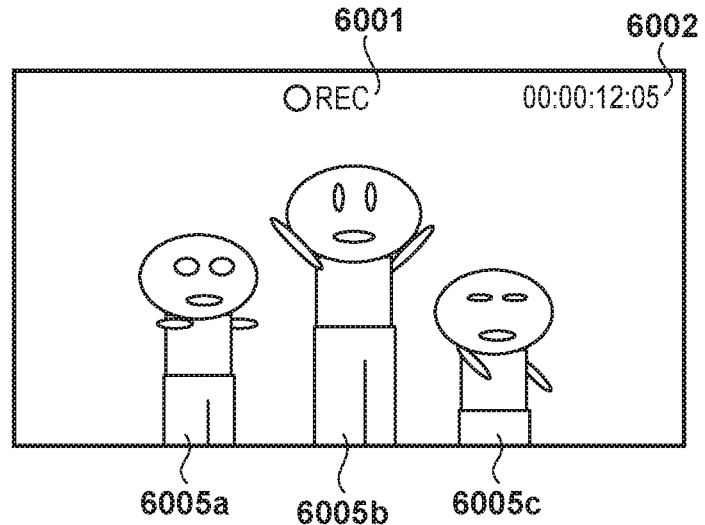
FIG. 6C is a diagram illustrating an example of a screen display in the digital camera according to embodiments.

In S4305, the system control unit 150 displays, in the display unit 128, a live view screen having, for example, no frame display as indicated in FIG. 6C, and then ends the processing of the position operation deactivation. In FIG. 6C, display elements identical to those in FIG. 6A are given identical reference signs, and redundant descriptions thereof will be omitted. If the AF mode is not currently tracking, the frames 6003, 6004a, and 6004b (FIG. 6A), which indicate the detected object areas, and the AF frame 6006 (FIG. 6B), are not displayed in the live view screen.

In S4303, the system control unit 150 determines whether or not the object has been lost in the tracking process (that the tracking has failed); if the tracking has failed, the process moves to S4304, and if the tracking has not failed, the process moves to S4306.

In S4304, the system control unit 150 ends the tracking process, changes the parameter values, held in the system memory 152, that correspond to the AF mode to a state of no tracking, and ends the process of position operation deactivation. Through this, focus control with no tracking is carried out until tracking settings are made again.

In S4306, the system control unit 150 updates the setting of the AF frame to the movement position of the object during tracking as detected by the image processing unit 124.

In S4307, the system control unit 150 carries out focus control on the AF frame updated in S4306.

Figure 6D:
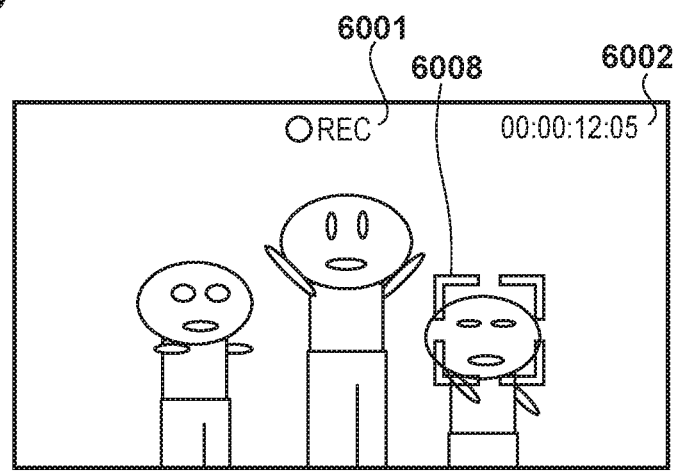
FIG. 6D is a diagram illustrating an example of a screen display in the digital camera according to embodiments.

In S4308, the system control unit 150 displays, in the display unit 128, a live view screen including, for example, a mark display indicating the object to be tracked (a tracking frame) as indicated in FIG. 6D, and then ends the process of the position operation deactivation. In FIG. 6D, display elements identical to those in FIG. 6A are given identical reference signs, and redundant descriptions thereof will be omitted.

6008 is a display of a frame indicating the object being tracked (the tracking frame).

FIG. 4CB is a flowchart illustrating details of the process of the tracking standby operation executed by the system control unit 150 in S4017.

In S4401, the system control unit 150 communicates, to the remote 200 via the external I/F 193 that the touch panel 228a is to be operated in a relative position operation mode.

In S4402, the system control unit 150 determines whether or not information pertaining to a movement amount and a movement direction of a touch operation (movement information) has been received from the remote 200; if the information has been received, the process moves to S4403, and if the information has not been received, the process moves to S4404.

Figure 6E:
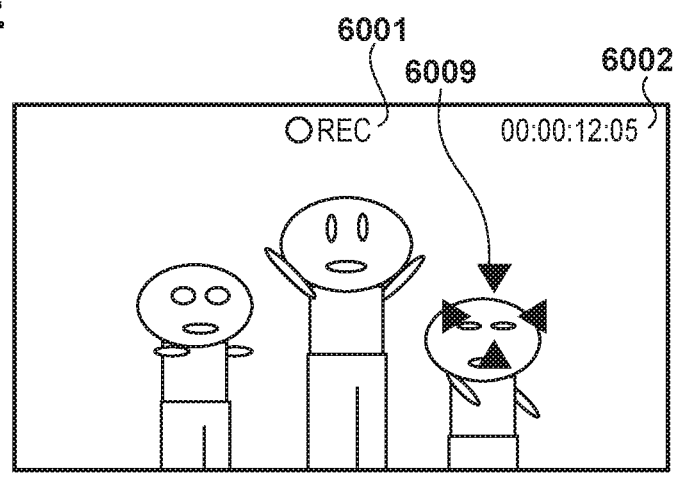
FIG. 6E is a diagram illustrating an example of a screen display in the digital camera according to embodiments.

In S4403, the system control unit 150 sets a movement destination position of the tracking frame on the basis of the current position of the tracking frame (the AF frame) and the movement information received in S4402, and moves the process to S4404. In S4404, the system control unit 150 displays, in the display unit 128, a live view screen including, for example, a display indicating the object to be tracked when the tracking starts (the tracking standby frame) as indicated in FIG. 6136E, and then ends the processing of the tracking standby operation. In FIG. 6E, display elements identical to those in FIG. 6A are given identical numbers, and descriptions thereof will be omitted.

In FIG. 6E, 6009 is a display indicating the position of the tracking frame (tracking standby frame) after movement.

Note that the tracking operations have not been started at this point in time. Upon receiving an instruction to start tracking from the remote 200, the system control unit 150 starts the tracking process using the tracking standby frame at that point in time as the tracking frame.

Figure 7:
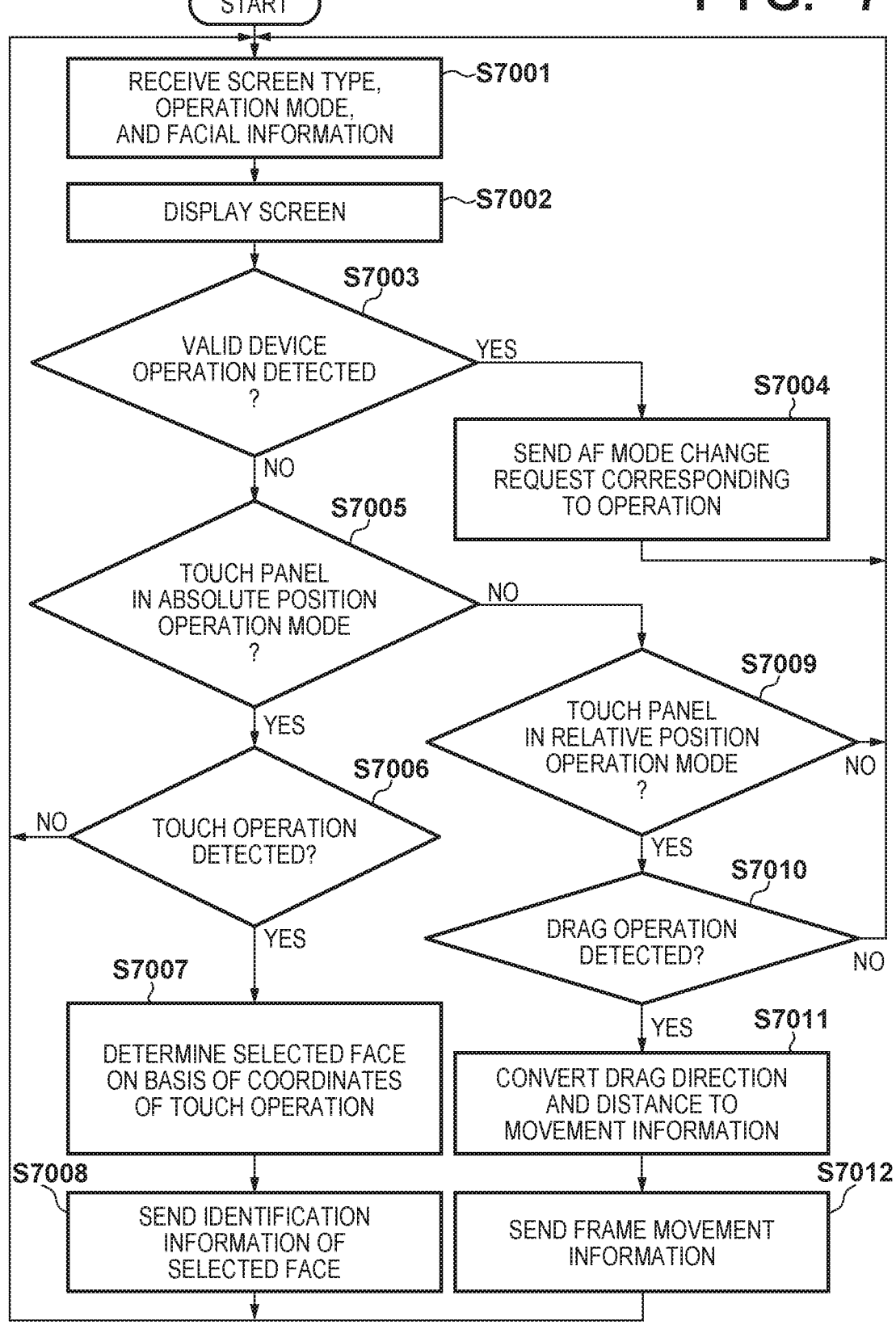
FIG. 7 is a flowchart pertaining to operations of the remote controller according to embodiments.

FIG. 7 is a flowchart illustrating operations executed by the remote 200 in tandem with operations carried out by the camera 100 as described using FIGS. 4AA to 4CB. The operations indicated in the flowchart of FIG. 7 are realized by the remote controller control unit 250 controlling the various units in the remote 200 on the basis of a program stored in the nonvolatile memory 256.

In S7001, the remote controller control unit 250 receives, from the camera 100 via the external I/F 293, information of a screen to be displayed in the display unit 228, an operation mode of the touch panel 228a, and information of detected faces. Here, the information of the screen is the information communicated by the camera 100 in S4009, S4011, S4013, S4014, or S4016. The mode of the touch panel 228a is the information communicated by the camera 100 in S4101, S4201, S4301, or S4401. The information of the faces is the information communicated by the camera 100 in S4009 or S4103. The touch panel 228a has a plurality of operation modes, including the absolute position operation mode (a first operation mode) and the relative position operation mode (a second operation mode). The remote controller control unit 250 sets one of the plurality of operation modes in the touch panel 228a in accordance with the operation mode received from the camera 100.

In S7002, the remote controller control unit 250 displays the screen illustrated in any one of FIGS. 5A to 5F in the display unit 228 on the basis of the screen identification information (or screen data) received in S7001.

In S7003, the remote controller control unit 250 determines whether or not a valid device operation based on the currently-displayed screen (an operation aside from a touch operation) has been detected; if the operation has been detected, the process moves to S7004, and if the operation has not been detected, the process moves to S7005. For example, if the screen illustrated in FIG. 5A is currently displayed, operating a device (a button or key included in the operating unit 270) assigned to the guide display 5001a, 5002a, or 5004 is included in valid operations. The display screen and the valid operations are associated with each other and held in, for example, the nonvolatile memory 256 of the remote 200, and the remote controller control unit 250 can determine whether or not a detected operation is a valid operation with respect to the current display screen by referring to the nonvolatile memory 256.

In S7004, the remote controller control unit 250 generates an AF mode change request based on the valid operation detected in S7003, sends the request of the camera 100 via the external I/F 293, and returns the process to S7001.

In S7005, the remote controller control unit 250 determines whether or not the operation mode currently set is the absolute position operation mode; if the mode is the absolute position operation mode, the process moves to S7006, and if the mode is not the absolute position operation mode, the process moves to S7009.

In S7006, the remote controller control unit 250 determines whether or not a touch-down operation in the touch panel 228a, made in a position within the area of the display unit 228 aside from the guide displays 5001a, 5002a, and 5004, has been detected. Although it is assumed here that the primary face is set at a position where the touch-down operation is detected, a position where another touch operation is detected, e.g. a touch-up or a double-tap operation, may be used instead. If the remote controller control unit 250 determines that a specific touch operation (here, the touch-down operation) has been detected, the process moves to S7007, and if the specific touch operation has not been detected, the process returns to S7001.

In S7007, the remote controller control unit 250 determines the face specified by the touch operation on the basis of the position (coordinates) where the touch operation was detected in S7006 and the facial information (or the display position and size of each facial frame) received in S7001, and then moves the process to S7008. To be more specific, if facial information corresponding to the position (coordinates) where the touch operation was made is present (if the position where the touch operation was made is within a facial frame), the corresponding facial information is determined to be the specified face. If no face is present at the position where the touch operation was made (the touched position), no face is selected in the processes of S7007 and S7008.

In S7008, the remote controller control unit 250 sends the identification information of the face determined in S7007 to the camera 100 via the external I/F 293 as information of the selected face, and returns the process to S7001.

In S7009, the remote controller control unit 250 determines whether or not the operation mode currently set is the relative position operation mode; if the mode is the relative position operation mode, the process moves to S7010, and if the mode is not the relative position operation mode, the process returns to S7001.

In S7010, the remote controller control unit 250 determines whether or not a drag operation (a touch-move in which the movement distance of the touched position is greater than or equal to a prescribed distance) made on the touch panel 228a has been detected. If the remote controller control unit 250 determines that the drag operation has been detected, the process moves to S7011, and if the drag operation has not been detected, the process returns to S7001. Here, the drag operation is one example of an activated touch operation associated with the display screen in which the relative position operation mode is specified, and a different touch operation, such as a flick operation, may be used instead.

In S7011, the remote controller control unit 250 converts the direction and distance of the drag operation detected in S7010 into frame movement information. When converting the distance of the drag operation detected on the touch panel 228a into a distance on the captured image, an appropriate level of magnification is applied so that the amount of movement in the AF frame or tracking standby frame does not become excessive relative to the drag operation on the touch panel 228a. For example, assume that the movement distance is expressed as a number of pixels, and that the number of pixels in the display unit 228 is 1/10 the number of pixels corresponding to the resolution of the captured image in the horizontal and vertical directions. In this case, simply converting the movement amount of the drag operation on the touch panel 228a will result in a movement amount 10 times the amount of the drag operation in the horizontal direction and the vertical direction, which makes it difficult to make fine adjustments on the position. Accordingly, the remote controller control unit 250 converts the distance of the drag operation using a lower level of magnification than the number of pixels in the captured image/number of pixels in the display unit 228, in the horizontal or vertical direction. The system control unit 150 and the remote controller control unit 250 may exchange information and determine an initial value for the magnification when the remote 200 and the camera 100 are connected. Accordingly, the operation amount itself may be sent to the camera 100 from the remote controller control unit 250, and the conversion process of S7011 may be carried out by the system control unit 150.

If the distance of the drag operation is obtained not as a number of pixels but instead as an actual movement distance, the post-conversion size of the movement distance/captured image in the horizontal (vertical) direction may be set to be smaller than the size of the movement distance/touch panel in the horizontal (vertical) direction. However, it is assumed that the size of the captured image is a size converted at a prescribed ppi (e.g. 72 ppi or 96 ppi).

If the display unit 228 has an extremely small pixel pitch, the distance of the drag operation may be converted to a number of pixels in the case where the ppi is 72 or 96, and may then further be converted into a distance in the captured image. A function for dynamically adjusting the sensitivity of the movement amount of the AF frame, the tracking standby frame, and so on with respect to a drag operation made on the touch panel 228*a* may be assigned to any of the devices included in the operating unit 270.

In S7012, the remote controller control unit 250 sends the frame movement information generated in S7011 to the camera 100 via the external I/F 293, and returns the process to S7001.

According to the present embodiment as described thus far, when an area detected using a function of the camera is selected, such as when selecting a specific object, absolute position specification in a touch-sensitive device such as a touch panel is activated. On the other hand, if an area is not detected using a function of the camera, or movement of an AF frame or a tracking frame is specified, the absolute position specification in the touch-sensitive device is inactivated, and relative position specification is activated. In other words, whether to activate a position of a touch operation made on the touch-sensitive device or activate a direction, amount, or the like of the operation is dynamically switched depending on whether or not a specific area is detected by the camera.

If an area detected by the camera is selected, a position can be specified accurately, even in a small touch-sensitive device or a touch sensitive device that does not display an image, by specifying a desired position within or near the area. The position of the touch operation with respect to the touch-sensitive device is therefore activated. On the other hand, in other cases, at least one of an operation direction and operation amount is activated instead of the position of the touch operation. This makes it possible to experience the convenience of touch operations while preventing unintended results caused by specifying an absolute position in an image using a small touch-sensitive device or a touch-sensitive device that does not display images. The camera carries out this switching automatically, which further increases the convenience. Additionally, when tracking an object, the tracking can be started from a tracking standby state and completed through a common operational sequence, regardless of whether or not the object to be tracked is detected.

To be more specific, if, when absolute position specification is activated (when the absolute position operation mode is set), a touch-down (the start of a touch) is detected, the remote controller control unit 250 determines whether the position where the touch-down was detected (the touch-down position) is a position corresponding to any facial information (whether or not a touch-down has been made within any facial frame). If the touch-down position is a position corresponding to any of the facial information, the remote controller control unit 250 sends the face of the corresponding facial information to the camera 100 as the information of the selected face. In other words, if absolute position specification is activated, the remote controller control unit 250 executes a process corresponding to the touch-down position (a process of selecting the face corresponding to the touch-down position).

In this case, the remote controller control unit 250 assumes that the face corresponding to the touch-down position has been selected, regardless of which face had been selected before the touch-down was detected. Furthermore, even if movement in the touched position (touch-move) or a touch-up are not detected, the remote controller control unit 250 assumes, if the touch-down position is within a facial frame, that the face corresponding to that facial frame has been selected. In other words, if absolute position specification is activated, a function corresponding uniquely to the touched position is executed. This processing is not based on the setting value prior to the detection of the touch operation (the position of the AF frame or the tracking frame prior to the detection of the touch operation). Rather than selecting a face with a touch-down, if there is a touch-up, the face corresponding to the last touched position detected before the touch-up was made may be selected.

On the other hand, if relative position specification is activated (if the relative position operation mode is set), the remote controller control unit 250 does not move the AF frame, the tracking frame, or the like even if a touch-down (the start of a touch) is detected, and instead maintains the position from before the touch started. When a touch-down is detected and the touch position is then moved (a touch-move), the remote controller control unit 250 carries out a process for moving the AF frame or the tracking frame by generating frame movement information (including a movement amount and a movement direction of the touched position) and sending that information to the camera 100. The AF frame or the tracking frame is moved from the position that was set before the touch that triggered the generation of the frame movement information was made, in the direction and by the movement amount based on the frame movement information.

In other words, when relative position specification is activated, the touch-down position is used to calculate the movement amount and movement direction of the touched position, but the AF frame or the tracking frame does not correspond directly to the movement destination. The movement direction and the movement amount of the AF frame or the tracking frame are the same regardless of the position where the touch-move starts as long as the movement amount and the movement direction of the touched position are the same. In other words, if relative position specification is activated, a process corresponding to the movement amount and movement direction of the touched position is executed, but a function corresponding uniquely to the touched position is not executed. If the relative position specification is activated, the processing is based on the setting value prior to the touch operation being detected (the position of the AF frame or the tracking frame prior to the touch operation being detected). Specifically, the setting value prior to the touch operation being carried out is a setting value changed by an amount equivalent to the change corresponding to the movement amount and the movement direction of the touched position.

Meanwhile, the live view image is displayed in the display unit of the camera along with information such as the results of area detection and the current AF frame, and thus more accurate operations can be carried out by operating an external remote controller of the camera while viewing the display unit of the camera.

Additionally, after absolute position specification has been inactivated, the absolute value specification is not activated until a prescribed condition has been met. This makes it possible to suppress a situation in which the absolute position specification switches between being activated and inactivated over a short period of time in the touch-sensitive device when detection using the area detection function of the camera is unstable.

Other Embodiments

The present invention can also be used for functions aside from focus control. For example, the position of an area determined in accordance with a touch operation (the AF frame or the tracking standby frame), information of a selected area, and so on may be used in automatic exposure (AE) processing, white balance control processing, and so on.

Additionally, the area detected by the function of the camera is not limited to an object area such as a facial area. For example, at least one of a high-brightness area having a brightness exceeding a first prescribed value (e.g. a blown-out highlight area) and a low-brightness area having a brightness less than a second prescribed value (e.g. a blocked-out shadow area) may be detected. Or, an area having a specific color (e.g. a white area) may be detected.

Additionally, parts of the flows illustrated in FIGS. 4AA to 4CB may be carried out by the remote controller control unit 250 of the remote 200, and parts of the flow illustrated in FIG. 7 may be carried out by the system control unit 150 of the camera 100. For example, the coordinate conversion process in S7007 and S7011 may be carried out by the camera 100. In this case, instead of S7008 and S7012, the remote 200 sends event information indicating the type of touch operation (touch-down operation, drag operation, or the like), an operation position, an operation direction, and an operation amount to the camera 100. The same effects as in the above-described embodiment can be achieved in this case as well.

Alternatively, the camera 100 and the remote 200 may be incorporated into a single housing as an integrated device. In this case, the external I/F 193 and the external I/F 293 are replaced with bus connections within the device. Equivalent modules such as the system control unit 150 and the remote controller control unit 250 can then be combined into a single module. The same effects as in the present embodiment can be achieved with such a configuration as well.

The camera 100 and the remote 200 may be incorporated into a single housing as an integrated device, and furthermore, a separate remote controller corresponding to the remote 200 may then be made connectable to that device. By doing so, if a cameraman and an assistant are shooting as a team, both the cameraman handling the camera 100 and the assistant handling the separate remote 200 can operate frames using the same procedure.

Note that the system control unit 150, the remote controller control unit 250, and so on may be realized as a single piece of hardware, or may be realized by dividing processing up among a plurality of pieces of hardware. The hardware that realizes the system control unit 150, the remote controller control unit 250, and so on, may be a programmable processor such as a CPU, dedicated hardware such as an ASIC, or the like.

Furthermore, although the above embodiment primarily describes operating the touch panel 228a of the remote 200 connected to the camera 100, using the remote 200 is not a requisite of the present invention, and the present invention can be carried out with the camera 100 alone.

When carrying out the present invention with the camera 100 alone, operations performed by the above-described remote controller control unit 250, including setting the operation mode based on the state of detecting an object area, operations carried out in accordance with the operation mode, and so on, are executed by the system control unit 150 in the following cases, for example:

when a proximity sensor provided near the viewfinder (an optical viewfinder or an electronic viewfinder) has detected that the user is using the viewfinder when a display is being made in a display unit in the viewfinder when an instruction has been made by the user by operating the operating unit 170

Specifically, the system control unit 150 may carry out the same control operations for the display unit 128 and the touch panel 128a as the remote controller control unit 250 carries out for the display unit 228 and the touch panel 228a. In this case, if the viewfinder is an electronic viewfinder, a mark display such as a facial frame, an AF frame, or a tracking frame may be displayed in the display unit of the viewfinder along with the live view, in the same manner as the control carried out when the system control unit 150 makes a display in the display unit 128, described in the above embodiment. If the viewfinder is an optical viewfinder, the live view display may be omitted, and the mark display such as the facial frame, the AF frame, or the tracking frame may be superimposed on an optical image in the display unit in the viewfinder so as to be visible. Activating operations made with respect to the touch panel 128a even when a live view display is not made in the display unit 128 makes it possible to use the touch panel 128a in the same manner as the above-described touch panel 228a of the remote 200.

Although the foregoing has described preferred embodiments of the present invention in detail, the present invention is not intended to be limited to the specific embodiments, and all variations that do not depart from the essential spirit of the invention are intended to be included in the scope of the present invention. Furthermore, the above-described embodiments are nothing more than individual embodiments of the present invention. The various configurations described in the embodiments can furthermore be combined as appropriate.

The foregoing embodiments describe embodiments in which the present invention is applied in a digital still camera, which is an example of an electronic apparatus, or in an image capturing system using the camera. However, the present invention can be applied in any desired electronic apparatus having an image capturing function and a touch sensor (touch panel, touchpad). It is also not necessary for the touch sensor to be built into the display device or disposed on the display device. Personal computers, tablet terminals, portable electronic devices (PDAs), mobile phones, image viewers, media players, game consoles, e-book readers, and the like can be given as examples of electronic apparatuses in with the present invention can be implied, but the present invention is not limited thereto. However, although the present invention can be applied in such electronic apparatuses, the present invention is particularly useful in portable electronic apparatuses having a small area where a touch sensor can be installed.

The present invention is not limited to the above embodiments and various changes and modifications can be made within the spirit and scope of the present invention. Therefore, to apprise the public of the scope of the present invention, the following claims are made.

According to the present invention, an electronic apparatus that achieves both the convenience of a touch operation and an accurate position specification, and a method for controlling the same, can be provided.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An electronic apparatus comprising:
a touch detector configured to detect an operation on a touch sensing surface;
a memory and at least one processor and/or at least one circuit, which function as:
a setting unit configured to
set a first operation mode in the case where an area that meets a predetermined condition is detected in an image and
set a second operation mode in the case where the area is not detected or detection of the area is not carried out; and
a control unit configured to perform control to
execute, in the case where the first operation mode is set, a function corresponding to a position where the touch detector has detected a touch, and
execute, in the case where the second operation mode is set, a process based on a movement operation of a touched position instead of processing corresponding to the position where the touch detector has detected the touch,
wherein in the case where the second operation mode is set, the control unit carries out control so that even if the touch detector has detected a touch, a mark that indicates a part of the image is not moved from a position at which the mark was prior to the touch being detected, and when a movement of the position of the touch is detected, the mark is moved in accordance with an amount and direction of the movement of the position of the touch, as the process based on the movement of the touched position.

2. The electronic apparatus according to claim 1, wherein the image is an image captured by an image capturing unit, and the area that meets the predetermined condition is an area of a specific object.

3. The electronic apparatus according to claim 2, wherein the specific object is the face of a person.

4. The electronic apparatus according to claim 1, wherein the function corresponding to the position where a touch has been detected is a function that selects an area, from among detected areas, that corresponds to the position where the touch has been detected.

5. The electronic apparatus according to claim 4, wherein the selected area is set as a primary object, and is considered as a target to be focused on in AF when image capturing unit capture an image.

6. The electronic apparatus according to claim 1, wherein the case where the first operation mode is set, the control unit carries out control so that a function corresponding to a position where a touch has been detected is executed in response to a detection of the touch by the touch detector.

7. The electronic apparatus according to claim 1, wherein the mark is a mark indicating a position to be focus on in AF when the image capturing unit capture an image.

8. The electronic apparatus according to claim 1 wherein the touch sensing surface is different from a display surface of the image.

9. The electronic apparatus according to claim 1, further comprising:
an image sensor;
a viewfinder;
a first display that can be viewed through the viewfinder; and
a second display that can be viewed without the viewfinder,
wherein the image is an image captured by the image sensor;
the touch sensing surface is a display surface of the second display; and
in the case where the image is being displayed in the first display, the control unit carries out control so that the function corresponding to the position where the touch has been detected or the processing based on the movement operation of the touched position is carried out in accordance with a state of the area detection.

10. The electronic apparatus according to claim 1, wherein the area detection is carried out by an image capturing apparatus communicatively connected to the electronic apparatus.

11. The electronic apparatus according to claim 1, wherein in the case where the area has gone from a state of not being detected to a state of being detected, the setting unit does not change from the second operation mode to the first operation mode until a predetermined condition is met.

12. The electronic apparatus according to claim 11, wherein the predetermined condition is a set amount of time passing after the execution of the processing.

13. A method of controlling an electronic apparatus, comprising:
setting a first operation mode in the case where an area that meets a predetermined condition is detected in an image and setting a second operation mode in the case where the area is not detected or detection of the area is not carried out;
detecting an operation on a touch sensing surface; and
performing control that comprises:
executing, in the case where the first operation mode is set, a function corresponding to a position where the detecting has detected a touch; and
executing, in the case where the second operation mode is set, a process based on a movement operation of a touched position instead of a process corresponding to the position where the detecting has detected the touch,
wherein in the case where the second operation mode is set, the performing control comprises carrying out control so that even if a touch has been detected, a mark that indicates a part of the image is not moved from a position at which the mark was prior to the touch being detected, and when a movement of the position of the touch is detected, the mark is moved in accordance with an amount and direction of the movement of the position of the touch, as the process based on the movement of the touched position.

14. A non-transitory computer-readable storage medium in which is stored a program that causes a computer of an electronic apparatus that comprises a touch detector configured to detect an operation on a touch sensing surface to function as:
a setting unit configured to
set a first operation mode in the case where an area that meets a predetermined condition is detected in an image and
set a second operation mode in the case where the area is not detected or detection of the area is not carried out; and
a control unit configured to perform control to:
execute, in the case where the first operation mode is set, a function corresponding to a position where the touch detector has detected a touch, and
execute, in the case where the second operation mode is set, a process based on a movement operation of a touched position instead of processing corresponding to the position where the touch detector has detected the touch,
wherein in the case where the second operation mode is set, the control unit carries out control so that even if the touch detector has detected a touch, a mark that indicates a part of the image is not moved from a position at which the mark was prior to the touch being detected, and when a movement of the position of the touch is detected, the mark is moved in accordance with an amount and direction of the movement of the position of the touch, as the process based on the movement of the touched position.

* * * * *